(12) United States Patent
Warita

(10) Patent No.: US 11,361,263 B2
(45) Date of Patent: Jun. 14, 2022

(54) INFORMATION PROCESSING DEVICE, TERMINAL DEVICE, INFORMATION PROCESSING METHOD, AND RECORDING MEDIUM

(71) Applicant: NEC CORPORATION, Tokyo (JP)

(72) Inventor: Kazuyoshi Warita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 96 days.

(21) Appl. No.: 16/489,923

(22) PCT Filed: Mar. 1, 2018

(86) PCT No.: PCT/JP2018/007705
§ 371 (c)(1),
(2) Date: Aug. 29, 2019

(87) PCT Pub. No.: WO2018/159739
PCT Pub. Date: Sep. 7, 2018

(65) Prior Publication Data
US 2020/0005221 A1 Jan. 2, 2020

(30) Foreign Application Priority Data
Mar. 3, 2017 (JP) .............................. JP2017-040661

(51) Int. Cl.
*G06Q 10/06* (2012.01)
*G06K 9/62* (2022.01)
*G06V 20/52* (2022.01)

(52) U.S. Cl.
CPC ... *G06Q 10/063114* (2013.01); *G06K 9/6215* (2013.01); *G06Q 10/063112* (2013.01); *G06V 20/53* (2022.01)

(58) Field of Classification Search
None
See application file for complete search history.

(56) References Cited

U.S. PATENT DOCUMENTS

| 2004/0111464 A1 | 6/2004 | Sorensen |
| 2015/0006213 A1* | 1/2015 | Heier ............. G06Q 10/063116 705/7.16 |

(Continued)

FOREIGN PATENT DOCUMENTS

| JP | 2004-138513 A | 5/2004 |
| JP | 2006-134212 A | 5/2006 |

(Continued)

OTHER PUBLICATIONS

Written Opinion for PCT/JP2018/007705, dated May 15, 2018.

(Continued)

*Primary Examiner* — Patricia H Munson
*Assistant Examiner* — Chesiree A Walton
(74) *Attorney, Agent, or Firm* — Sughrue Mion, PLLC

(57) ABSTRACT

The purpose of the present invention is to effectively deploy limited human resources. Provided is an information processing device (210) including: a specifying unit (211) that specifies positions of customers in a certain space; a determination unit (212) that determines the deployment of store clerks on the basis of the number of store clerks and the specified positions; and an output unit (213) that outputs deployment information indicating the determined deployment.

13 Claims, 14 Drawing Sheets

(56) References Cited

U.S. PATENT DOCUMENTS

| | | | | |
|---|---|---|---|---|
| 2015/0025929 A1* | 1/2015 | Abboud | ......... | G06Q 10/063114 |
| | | | | 705/7.15 |
| 2015/0235161 A1* | 8/2015 | Azar | ................... | G06Q 30/016 |
| | | | | 705/7.15 |
| 2015/0324727 A1* | 11/2015 | Erhart | ............ | G06Q 10/063114 |
| | | | | 705/7.15 |
| 2016/0364731 A1* | 12/2016 | Ushiki | ........... | G06Q 10/063112 |
| 2017/0046649 A1* | 2/2017 | Kyle, Jr. | ........ | G06Q 10/063114 |
| 2018/0204053 A1* | 7/2018 | Yokozeki | .................. | G06T 7/20 |

FOREIGN PATENT DOCUMENTS

| | | | |
|---|---|---|---|
| JP | 2007-133461 A | 5/2007 | |
| JP | 2007-300572 A | 11/2007 | |
| JP | 2009-238044 A | 10/2009 | |
| JP | 2015-149089 A | 8/2015 | |
| JP | 2017118324 A * | 6/2017 | ............ G06Q 30/02 |
| WO | 2016/103332 A1 | 6/2016 | |

OTHER PUBLICATIONS

International Search Report for PCT/JP2018/007705, dated May 15, 2018.

Japanese Office Action for JP Application No. 2017-040661 dated May 11, 2021 with English Translation.

* cited by examiner

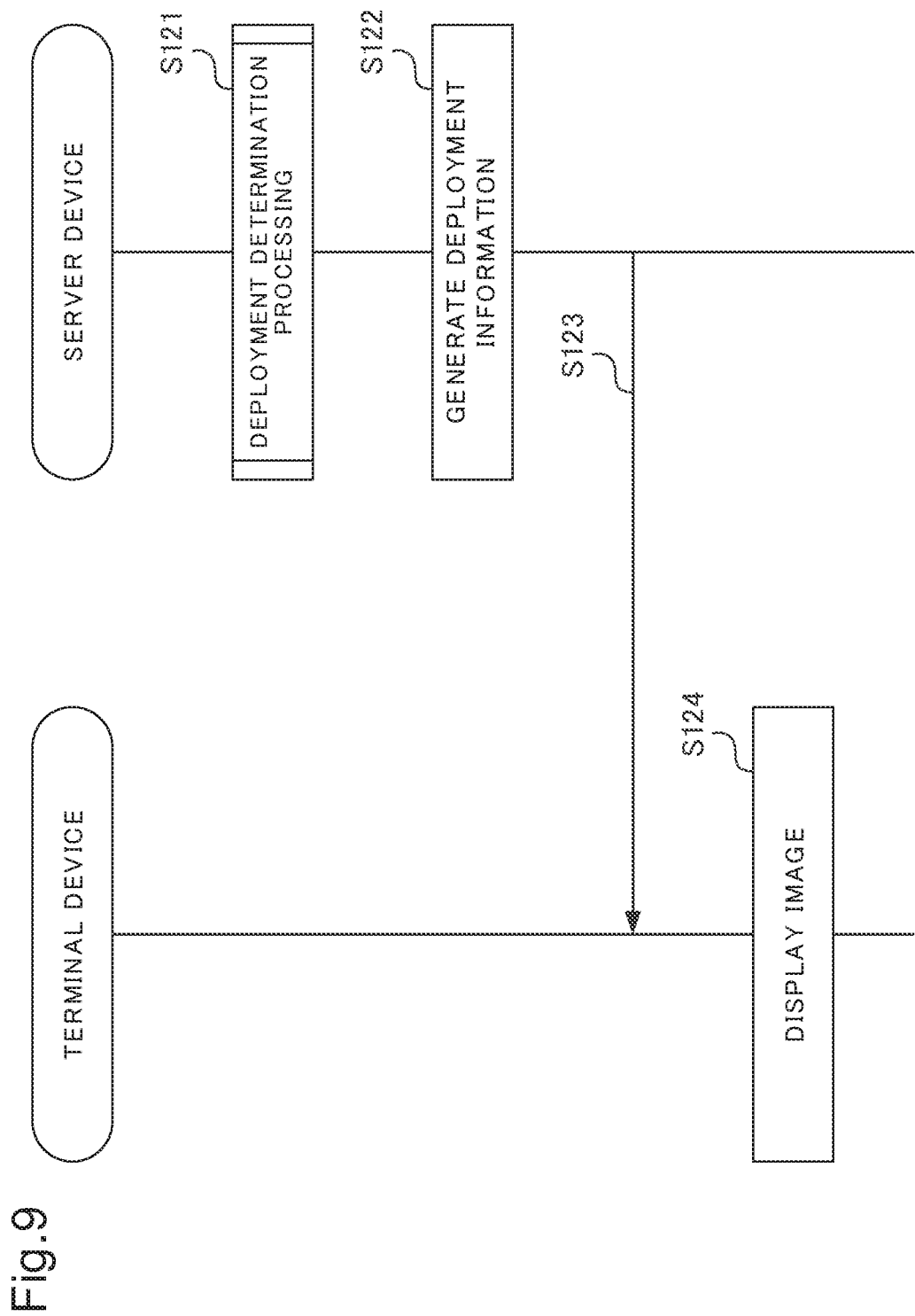

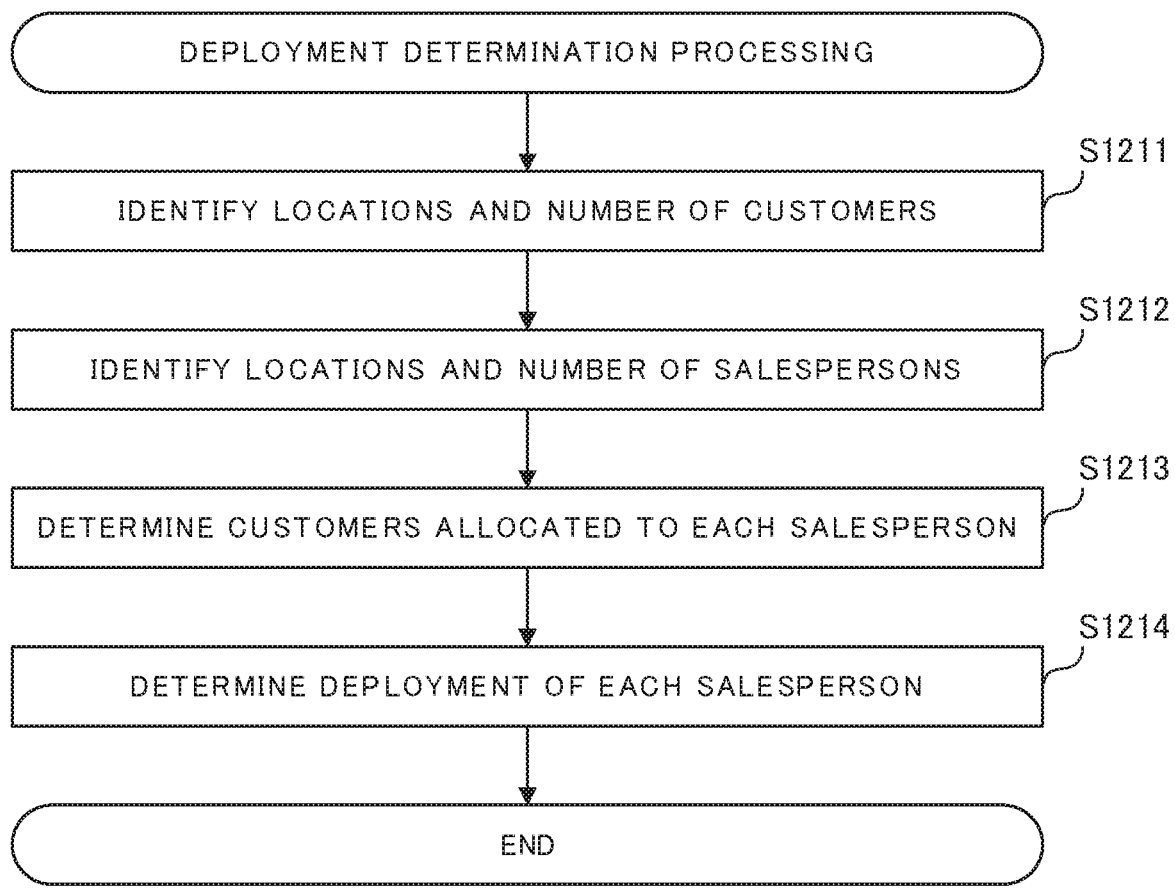

INFORMATION PROCESSING DEVICE, TERMINAL DEVICE, INFORMATION PROCESSING METHOD, AND RECORDING MEDIUM

This application is a National Stage of International Application No. PCT/JP2018/007705 filed Mar. 1, 2018, claiming priority based on Japanese Patent Application No. 2017-040661 filed Mar. 3, 2017, the disclosure of which is incorporated herein in its entirety by reference.

TECHNICAL FIELD

The present disclosure relates to an information processing device and the like and, for example, relates to an information processing device that determines a deployment of store clerks in a store.

BACKGROUND ART

Technologies for managing deployment of store clerks have been known. For example, PTL 1 discloses a technology for rapidly deploying employees to an area where congestion has occurred in a store. The technology disclosed in PTL 1 is aimed at deploying the employees to a congested area in the store and thereby improving customer satisfaction.

CITATION LIST

Patent Literature

[PTL 1] Japanese Unexamined Patent Application Publication No. 2006-134212 A

SUMMARY OF INVENTION

Technical Problem

However, customers are not always present in a congested area in the store and have a possibility of being present in other areas. When employees are deployed to the congested area in the store by the technology disclosed in PTL 1, employees who can serve customers disappear around customers in a comparatively uncongested area in the store and there is a possibility that customer satisfaction is reduced, contrary to expectations.

An exemplary object of the present disclosure is to provide a technology for deploying limited human resources effectively.

Solution to Problem

In an aspect of the invention, an information processing device is provided. The information processing device includes identification means for identifying locations of customers in a space; determination means for determining a deployment of store clerks, based on the number of the store clerks and the identified locations; and output means for outputting deployment information indicating the determined deployment.

In another aspect of the invention, a terminal device is provided. The terminal device includes acquisition means for acquiring information indicating a deployment of store clerks determined based on locations of customers and the number of the store clerks in a space; and output means for outputting the acquired information.

In further another aspect of the invention, an information processing method is provided. The information processing method includes identifying locations of customers in a space; determining a deployment of store clerks, based on the number of the store clerks and the identified locations; and outputting deployment information indicating the determined deployment.

In further another aspect of the invention, an information processing method is provided. The information processing method includes acquiring information indicating a deployment of store clerks determined based on locations of customers and the number of the store clerks in a space; and outputting the acquired information.

In further another aspect of the invention, a non-transitory recording medium is provided. The non-transitory recording medium records a program causing a computer to execute: processing of identifying locations of customers in a space; processing of determining a deployment of store clerks, based on the number of the store clerks and the identified locations; and processing of outputting deployment information indicating the determined deployment.

In further another aspect of the invention, a non-transitory recording medium is provided. The non-transitory recording medium records a program causing a computer to execute: processing of acquiring information indicating a deployment of store clerks determined based on locations of customers and the number of the store clerks in a space; and processing of outputting the acquired information.

Advantageous Effects of Invention

The present disclosure enables limited human resources to be deployed effectively.

BRIEF DESCRIPTION OF DRAWINGS

FIG. 9 is a sequence chart illustrating an example of operation of a server device and a terminal device;

FIG. 10 is a flowchart illustrating an example of deployment determination processing;

EXAMPLE EMBODIMENT 1.1: First Example Embodiment

Figure 1:
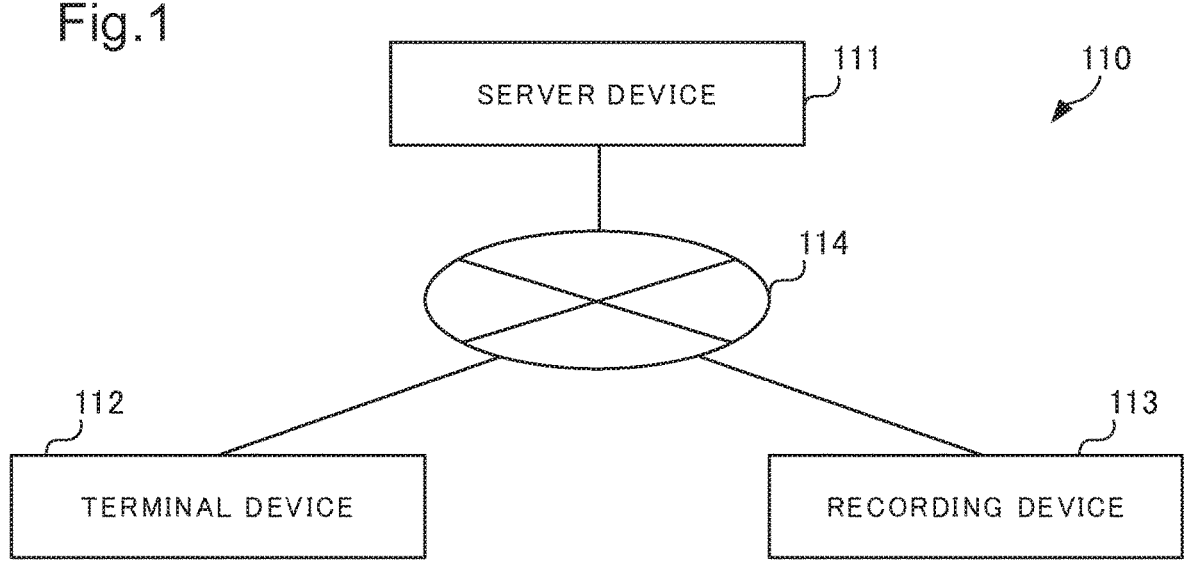
FIG. 1 is a block diagram illustrating an example of a configuration of a customer service assistance system.

FIG. 1 is a block diagram illustrating a configuration of a customer service assistance system 110 according to an example embodiment. The customer service assistance system 110 is an information processing system for assisting customer service performed by a store clerk in a store. The customer service assistance system 110 includes at least one or more server devices 111, one or more terminal devices 112, and one or more recording devices 113. The server devices 111, the terminal devices 112, and the recording devices 113 may communicate with the other devices via a network 114, such as the Internet and a wireless local area network (LAN), or may directly communicate with the other devices, not via the network 114.

In the present example embodiment, a store refers to a space where products are sold or services are provided. The store referred to above may be a complex commercial facility, like a shopping mall, constituted by a plurality of retail stores. In addition, the store clerk, as used in the present example embodiment, refers to a person who sells products or provides services to customers in a store. The store clerk can also be said to be a person who guides customers in a store. In addition, the customer, as used in the present example embodiment, refers to a person who visits a store and receives sale of products or provision of services. The customer can also be said to be a person who is guided in a store by a store clerk. Note that it does not matter whether or not the customer, referred to above, has actually purchased products or services in the past or in the visit. In addition, the numbers of store clerks and customers are not limited specifically.

Each server device 111 supplies a terminal device 112 with information for assisting customer service performed by a store clerk. This information is specifically information that indicates a deployment of one or a plurality of store clerks in a store. In the description below, the information is also referred to as "deployment information". In addition, the customer service referred to above may be rephrased as various types of guidance for customers. The server device 111 is a computer device, such as an application server, a mainframe, and a personal computer. However, the server device 111 is not limited to the computer devices exemplified above.

Each terminal device 112 presents information supplied by a server device 111. The presentation referred to above refers to outputting information in a perceptible manner. Although the perceptible output includes, for example, display by means of characters or an image, the perceptible output can include perception other than visual perception, such as auditory perception and tactile perception. In addition, the terminal device 112 is used by a store clerk. The terminal device 112 may be an electronic device held or worn by a store clerk. The terminal device 112 is a computer device, such as a smartphone, a tablet terminal, and a wearable device. However, the terminal device 112 is not limited to the computer devices exemplified above.

Each terminal device 112 and a store clerk are associated with each other by a predetermined method. For example, the association of each terminal device 112 with a store clerk may be determined in advance. Alternatively, each terminal device 112 may be associated with a specific store clerk by a well-known authentication method (password authentication, biometric authentication, and the like). In addition, a store clerk may hold an electronic device or a wireless tag separately from a terminal device 112, and the electronic device or wireless tag may be associated with the terminal device 112.

Each recording device 113 is an electronic device for measuring locations of persons (customers and store clerks). In the present example embodiment, the recording device 113 is an image capturing device, such as a monitoring camera, that is disposed on a ceiling or the like of a store and records images (that is, still images). In this case, the recording device 113 transmits image data representing captured images to a server device 111. The recording device 113 performs image capturing at a predetermined time interval and transmits image data in a repeated manner to the server device 111. Images represented by the image data may be either black-and-white images or color images, and the resolution thereof is not limited specifically. The recording device 113 can also be said to transmit image data representing a video (that is, a moving image) constituted by still images captured at a predetermined time interval to the server device 111.

The total number of each of the server devices 111, the terminal devices 112, and the recording devices 113 is not limited specifically. For example, the same or fewer number of terminal devices 112 than the number of store clerks may be included in the customer service assistance system 110. In addition, while at least one server device 111 can cover a required load, the number of server devices 111 may be increased according to the number of terminal devices 112 or other factors. The number of recording devices 113 can be varied according to the area and internal structure of the store.

Figure 2:
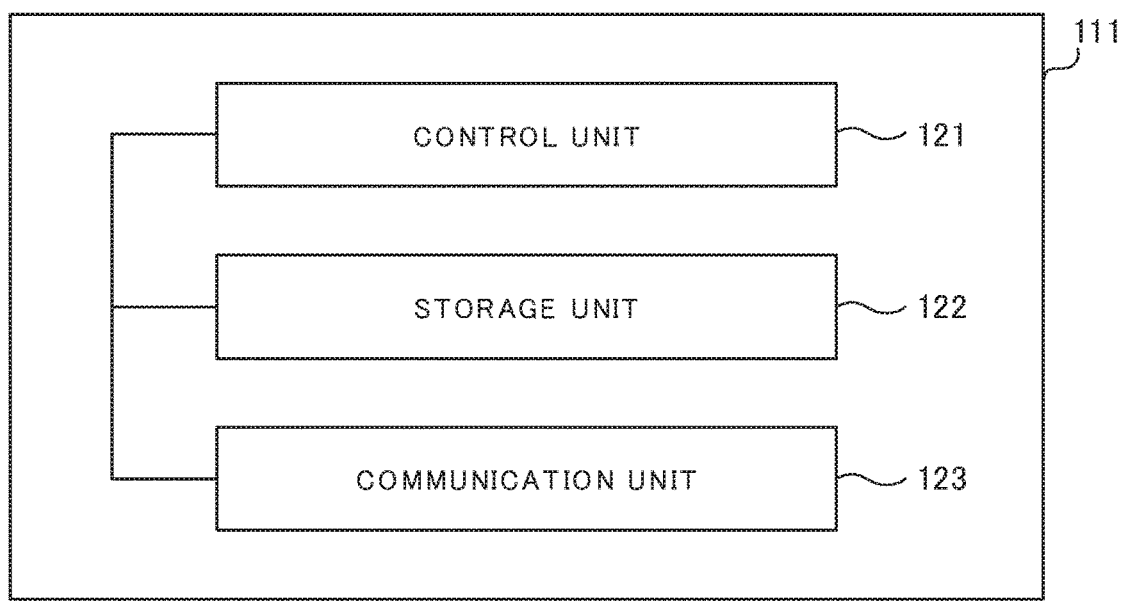
FIG. 2 is a block diagram illustrating an example of a hardware configuration of a server device.

FIG. 2 is a block diagram illustrating a hardware configuration of each server device 111. The server device 111 includes a control unit 121, a storage unit 122, and a communication unit 123. The server device 111 may include other constituent components, such as an input device (keyboard or the like) and a display device.

The control unit 121 controls operation of the server device 111. The control unit 121 is, for example, configured including one or more processors and one or more memories. The control unit 121 can, by executing a predetermined program, achieve functions to be described later.

The storage unit 122 stores data. The storage unit 122 includes a storage device, such as a hard disk drive and a flash memory. The storage unit 122 may be configured including a reader or writer for a detachable recording medium, such as an optical disk. The storage unit 122 is capable of storing data that are referred to by the control unit 121. In the data stored in the storage unit 122, map information is included. The storage unit 122 may store a program executed by the control unit 121.

The map information represents an internal structure (in particular, places where customers move back and forth) of the store and is data defining a coordinate system for the store. For example, the map information indicates coordinates of respective locations in the store with a Cartesian coordinate system with the origin set at a predetermined location of the store. In addition, the map information may include layout information. The layout information is data defining an arrangement of objects in the store. The layout information indicates, for example, locations of walls and store shelves of the store. From a certain point of view, it can also be said that the layout information indicates existence of an obstacle that obstructs a store clerk from visually recognizing a customer. From another point of view, it can also be said that the layout information indicates existence of an obstacle that obstructs a store clerk from passing.

Figure 3A:
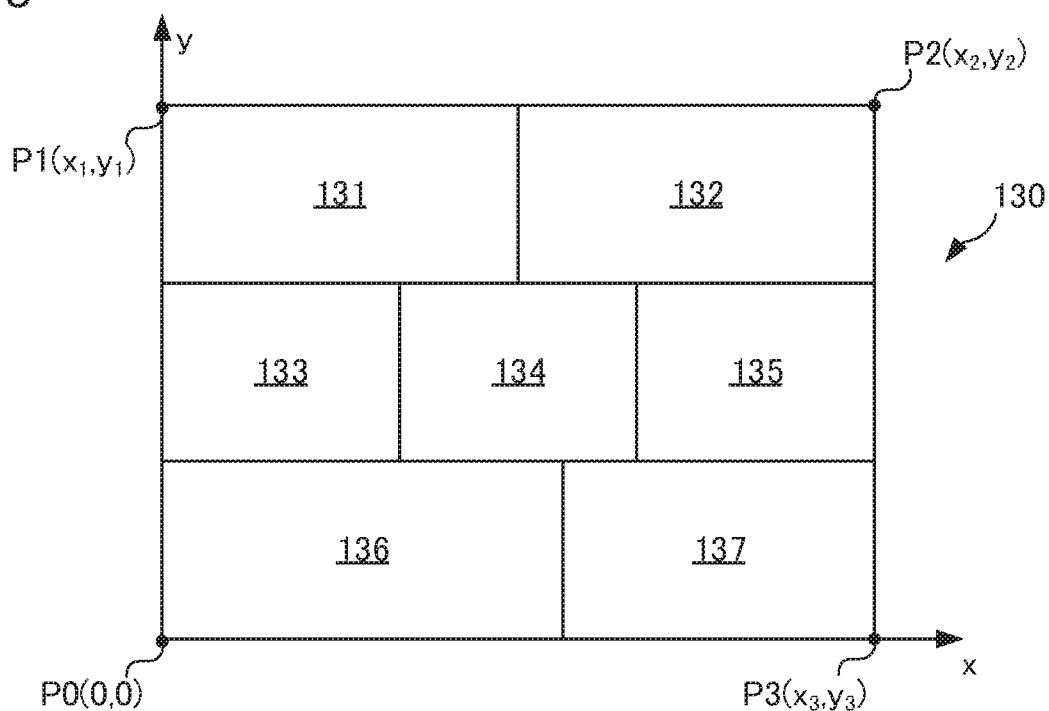
FIG. 3A is a schematic view illustrating an example of map information and layout information.

FIG. 3A is a schematic view illustrating an example of the map information and the layout information. Map information 130 defines a two-dimensional Cartesian coordinate system defined by the x-axis and the y-axis in the drawing for a store the floor of which has a rectangular shape. For example, the map information 130 represents a two-dimensional structure of a store by means of coordinate information indicating P0=(0, 0), P1=(x1, y1), P2=(x2, y2), and P3=(x3, y3) in the drawing. The layout information can represent a layout of sales spaces and store shelves in the store, using the x-axis and y-axis of the Cartesian coordinate system.

In the example in FIG. 3A, the floor of the store represented by the map information 130 is divided into areas 131, 132, 133, 134, 135, 136, and 137. The areas 131 to 137 represent sales spaces for different categories of products, such as the area 131 representing a sales space for foods and the area 132 representing a sales space for liquors. In this case, the layout information represents the areas 131 to 137, using the two-dimensional Cartesian coordinate system. The layout information may include coordinates of vertices or boundaries of the areas 131 to 137.

Figure 3B:
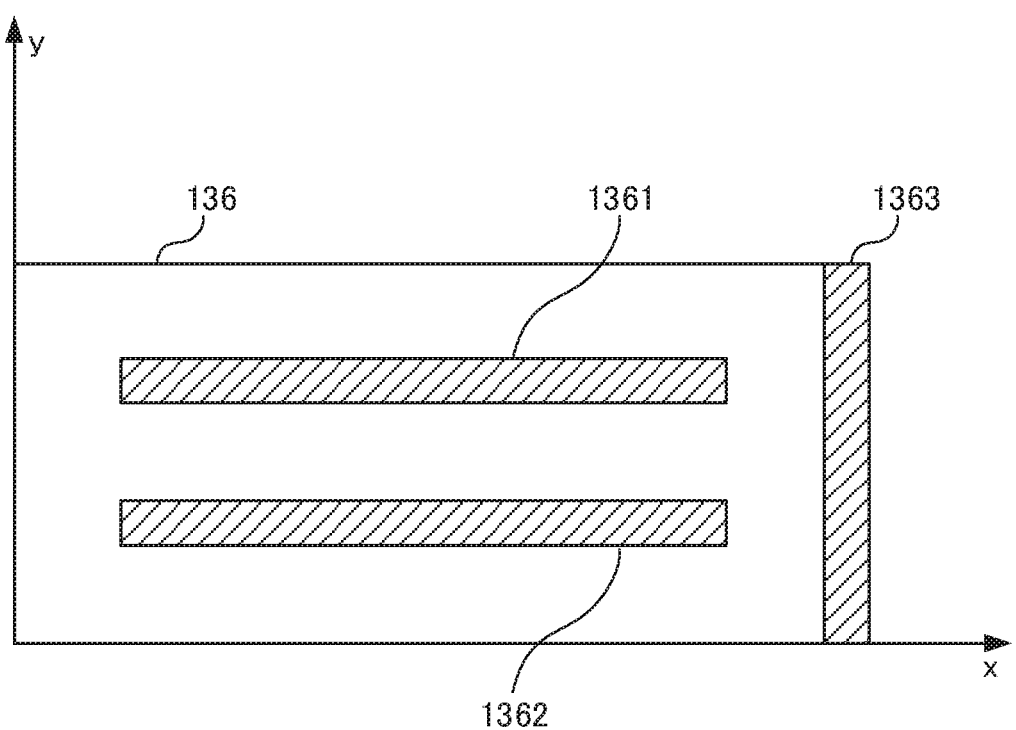
FIG. 3B is a schematic view illustrating another example of the map information and the layout information.

FIG. 3B is a schematic view illustrating another example of the layout information. In this example, store shelves 1361 and 1362 and a wall 1363 are included in the area 136. It is assumed that the store shelves 1361 and 1362 and the wall 1363 have height sufficiently higher than the height of the eye levels of store clerks. In this case, the wall 1363 separates the area 136 and the area 137 from each other. In this example, a store clerk cannot see the area 137 from the area 136. In this case, the layout information represents the store shelves 1361 and 1362 and the wall 1363, using the two-dimensional Cartesian coordinate system, as with the areas 131 to 137.

Note that the structure and layout of a store are not limited to the exemplification and may be more complex. In addition, the map information may be data representing a portion (not the whole) of a store. The layout information may be different data from the map information instead of a portion of the map information.

The communication unit 123 transmits and receives data with each terminal device 112 and each recording device 113. The communication unit 123 includes communication devices (or circuitry), such as a network adapter and an antenna. The communication unit 123 is wirelessly connected to each terminal device 112 and each recording device 113. The communication unit 123 may communicate with each terminal device 112 and each recording device 113 via another wireless equipment, such as an access point in a wireless LAN. The communication unit 123 may use different communication methods for communication with each terminal device 112 and communication with each recording device 113.

Figure 4:
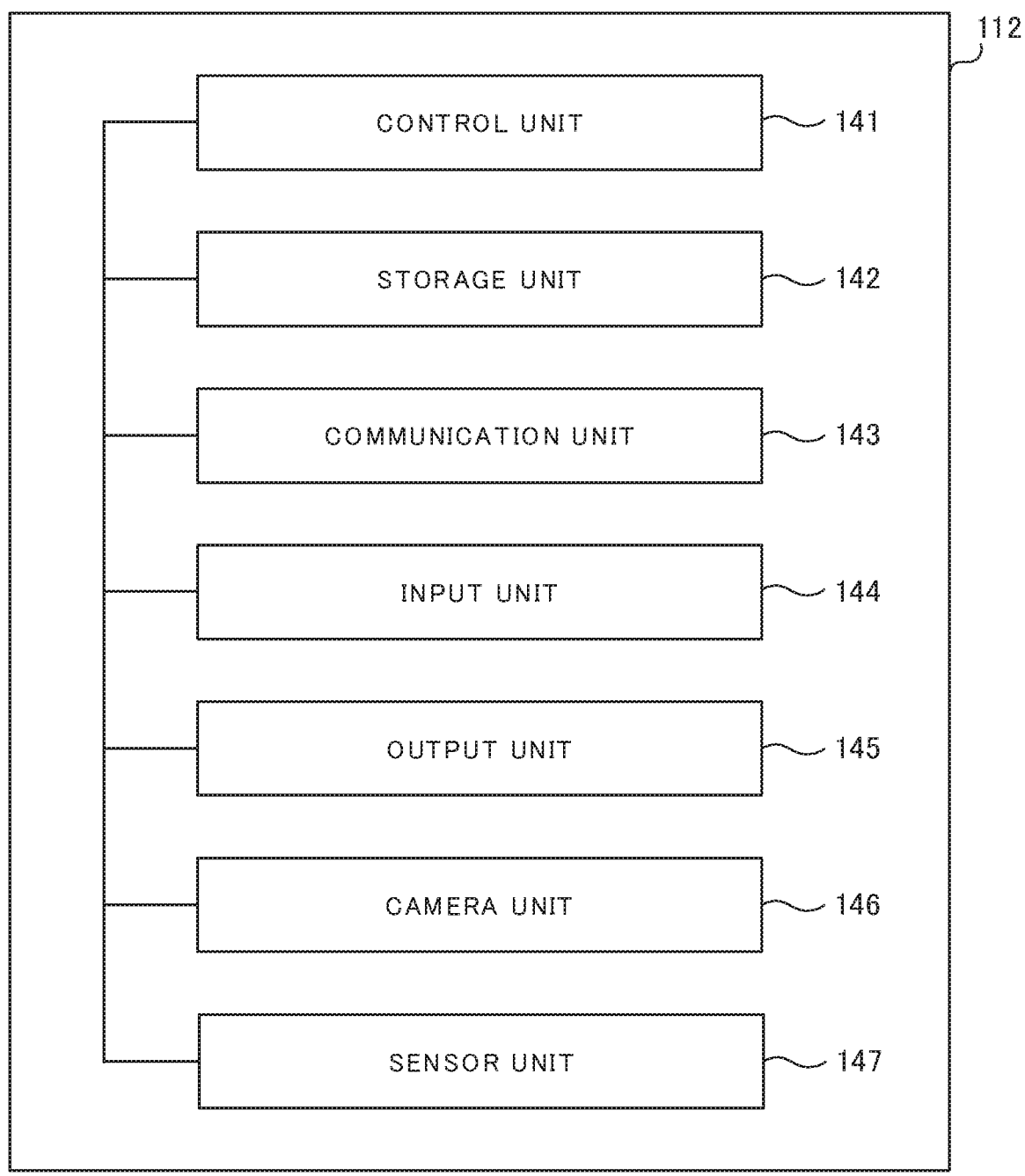
FIG. 4 is a block diagram illustrating an example of a hardware configuration of a terminal device.

FIG. 4 is a block diagram illustrating a hardware configuration of each terminal device 112. The terminal device 112 includes a control unit 141, a storage unit 142, a communication unit 143, an input unit 144, and an output unit 145. In addition, the terminal device 112 may include a camera unit 146 and a sensor unit 147. The terminal device 112 may also include another constituent component.

The control unit 141 controls operation of the terminal device 112. The control unit 141 is, for example, configured including one or more processors and one or more memories. The control unit 141 can, by executing a predetermined program, achieve functions to be described later.

The storage unit 142 stores data. The storage unit 142 includes a storage device, such as a flash memory. The storage unit 142 may be configured including a reader or writer for a detachable recording medium, such as a memory card. The storage unit 142 is capable of storing data that are referred to by the control unit 141. The storage unit 142 may store a program executed by the control unit 141.

The communication unit 143 transmits and receives data with each server device 111. The communication unit 143 includes an antenna, a radio frequency (RF) processing unit, a baseband processing unit, and the like. The communication unit 143 is wirelessly connected to each server device 111. The communication unit 143 may communicate with each server device 111 via another wireless equipment, such as an access point in the wireless LAN.

The input unit 144 accepts input from a user (a store clerk, in this case). The input unit 144 includes an input device, such as a key, a switch, and a mouse. In addition, the input unit 144 may include a touch screen display and/or a microphone for voice input. The input unit 144 supplies the control unit 141 with data according to the input from the user.

The output unit 145 outputs information. The output unit 145 includes a display device, such as a liquid crystal display. In the description below, although the terminal device 112 is assumed to include a touch screen display as the input unit 144 and the output unit 145, the terminal device 112 is not always limited to the configuration. In addition, the output unit 145 may include a speaker that outputs information by means of sound. The output unit 145 may include a light emitting diode (LED) or a vibrator for notifying the user of information.

The camera unit 146 captures an image of an object and thereby generates image data. The camera unit 146 includes an imaging device, such as a complementary metal oxide semiconductor (CMOS) image sensor. The camera unit 146 supplies the control unit 141 with the image data, which represent captured images. Images represented by the image data may be either black-and-white images or color images, and the resolution thereof is not limited specifically. In the description below, an image captured by the camera unit 146 is sometimes referred to as a "captured image" for the purpose of distinguishing the image from other images.

The sensor unit 147 measures a physical quantity that is usable for positioning of the terminal device 112. The sensor unit 147, for example, includes sensors for measuring acceleration, angular speed, magnetism, air pressure, and the like that are necessary for positioning by means of pedestrian dead-reckoning (PDR). Alternatively, the sensor unit 147 may include a so-called electronic compass, which measures azimuth, based on geomagnetism. In the present example embodiment, data (hereinafter, also referred to as "sensor data") indicating a physical quantity measured by the sensor unit 147 can also be used for accuracy improvement or correction of the location of the terminal device 112.

Figure 5:
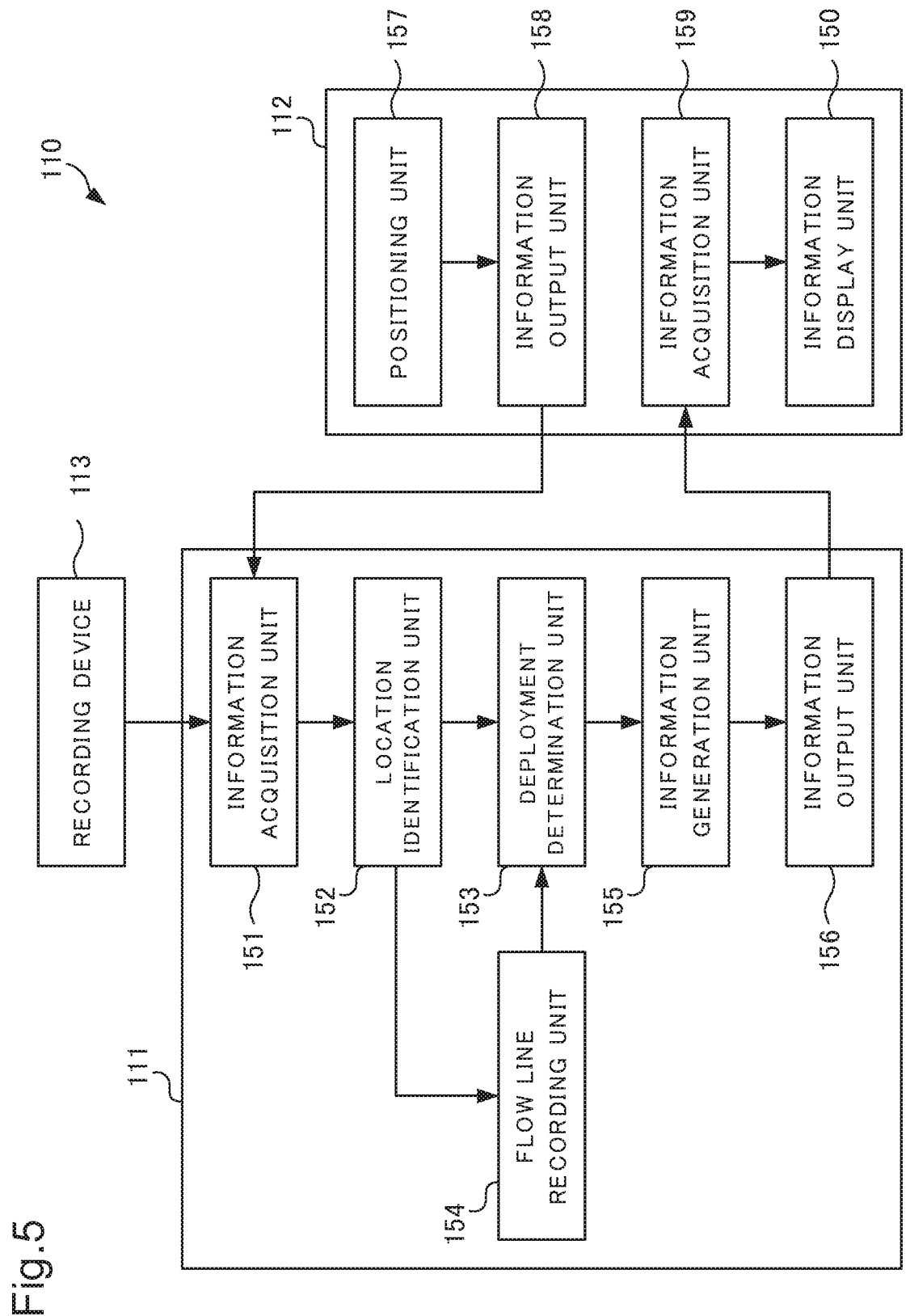
FIG. 5 is a block diagram illustrating a functional configuration of a customer service assistance system.

FIG. 5 is a block diagram illustrating a functional configuration of the customer service assistance system 110. Note that arrows between blocks in the block diagram exemplarily indicate flows of information. Therefore, flows of information in the customer service assistance system 110 are not limited to only the directions indicated by the illustrated arrows.

Each server device 111 includes an information acquisition unit 151, a location identification unit 152, a deployment determination unit 153, a flow line recording unit 154, an information generation unit 155, and an information output unit 156. The server device 111 achieves the functions of these respective units by the control unit 121 executing programs. Each terminal device 112 includes a positioning unit 157, an information output unit 158, an information acquisition unit 159, and an information display unit 150. The terminal device 112 achieves the functions of these respective units by the control unit 141 executing programs.

The information acquisition unit 151 acquires information from each terminal device 112 and each recording device 113. More in detail, the information acquisition unit 151 acquires location information indicating a location of a terminal device 112 from the terminal device 112 and acquires image data from a recording device 113. In the present example embodiment, each terminal device 112 is held by a store clerk. Therefore, it can be said that the location of a terminal device 112 practically coincides with the location of a store clerk in this situation.

The location identification unit 152 identifies a location of a person. The location identification unit 152 at least identifies a location of a customer. The location identification unit 152 may identify not only a location of a customer but also a location of a store clerk. The location identification unit 152 identifies a location of a person in the store, based on image data acquired by the information acquisition unit 151.

For example, the location identification unit 152 may detect a moving object from images represented by the image data and recognize the detected object as a person. Alternatively, the location identification unit 152 may detect a region (the head, the face, the body, or the like) that has human-like features from the image and recognize that a person exists at the detected region. The location identification unit 152 is capable of, based on a location of a person who was recognized in this manner in the image and the map information, identifying a location of the person in the store.

The location identification unit 152 can recognize a person, using a well-known human body detection technology. For example, technologies that detect a human body or a portion (the face, a hand, or the like) of the human body included in images, using various types of image feature amounts and machine learning are generally known. Mapping of the location of a person identified by the location identification unit 152 onto the coordinate system of the map information can also be achieved using a well-known method. Note that, on the floor surface or the like of the store, points of reference (markers or the like) for associating the coordinate system of image data with the coordinate system of the map information may be disposed.

When identifying a location of a store clerk, the location identification unit 152 can improve accuracy of the location identification, based on location information transmitted from a terminal device 112. For example, the location identification unit 152 may correct a location having been identified based on the image data, based on the location information. Alternatively, the location identification unit 152 may identify a location of a store clerk, based on the location information transmitted from the terminal device 112 instead of using the image data.

The location identification unit 152 identifies a location of each store clerk and, in conjunction therewith, may identify the number of store clerks in the store. In this case, the location identification unit 152 considers the number of store clerks whose locations were able to be identified as the number of store clerks. That is, in this case, identifying locations of store clerks can be considered to be the same as identifying the number of store clerks.

The deployment determination unit 153 determines a deployment of store clerks in the store. The deployment determination unit 153 determines a deployment of store clerks, based on at least the number of store clerks and locations of customers identified by the location identification unit 152. Note that, although the number of store clerks may be identified by the location identification unit 152, the number of store clerks may also be input via an input device.

The deployment determination unit 153 may determine a deployment of store clerks, based on, in addition to the number of store clerks and locations of customers identified by the location identification unit 152, other information (for example, locations of the store clerks). In addition, the deployment determination unit 153 may determine a deployment of store clerks, based on tracking information (flow line information), to be described later.

In some cases, the deployment determination unit 153 determines a deployment of store clerks in such a way that distances between customers and store clerks become as short as possible. Alternatively, the deployment determination unit 153 may determine a deployment of store clerks in such a way that the number of customers allocated per store clerk becomes uniform. In addition, the deployment determination unit 153 may determine a deployment of store clerks in such a way that distances between customers and store clerks become as short as possible and the number of customers allocated per store clerk becomes uniform.

The flow line recording unit 154 records a flow line of a person. As used herein, the flow line refers to a track of movement of a person. The flow line can also be said to be a movement history (trajectory) of a person. The movement trajectory may be rephrased as a location history, a tracking history, a walking history, a behavior history, or the like. The flow line recording unit 154 records transitions between locations of a person identified by the location identification unit 152. The flow line recording unit 154 records at least a flow line of a customer and may further record a flow line of a store clerk. In the description below, information indicating a flow line recorded by the flow line recording unit 154 is also referred to as "tracking information". The flow line recording unit 154 records tracking information in the storage unit 122 and, in conjunction therewith, updates the tracking information every time the person is identified by the location identification unit 152.

Note that a location of a person at a time point indicated by the tracking information can be said to be identical to the location of the person identified at the time point by the location identification unit 152. In other words, a location of a person identified at a time point by the location identification unit 152 can be said to be equivalent to the latest location of the person recorded in the tracking information at the time point.

Figure 6:
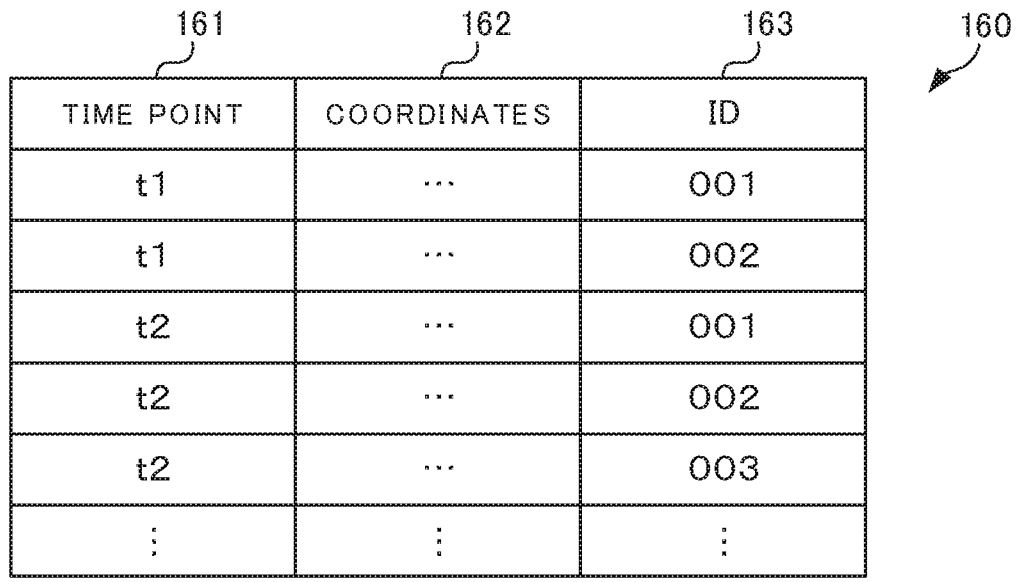
FIG. 6 illustrates an example of a data structure of tracking information.

FIG. 6 illustrates an example of the data structure of the tracking information. In the example, tracking information 160 includes time points 161, coordinates 162, and identifiers (IDs) 163. Each time point 161 indicates a time point at which coordinates 162 are identified by the location identification unit 152. Each coordinates 162 indicate a location identified by the location identification unit 152. Each ID 163 is an identifier assigned to distinguish a flow line. Each ID 163 is, for example, a numerical value with a predetermined number of digits that is unique for each flow line.

The flow line recording unit 154 records tracking information at a time point t1 by assigning a unique ID to each of locations identified by the location identification unit 152 at the time point t1. Next, the flow line recording unit 154, at a time point t2 succeeding the time point t1, compares locations identified by the location identification unit 152 with the tracking information at the time point t1.

In general, speed at which a human walks is equal to or less than a certain speed (approximately 4 to 5 km per hour) and is not substantially faster than the speed. Therefore, it can be said that a range within which a person whose location was recorded in the tracking information at the time point t1 moves by the time point t2 is practically restricted to a certain range. When coordinates (first coordinates) identified at the time point t1 by the location identification unit 152 and coordinates (second coordinates) identified at the time point t2 thereby are within the certain range, the flow line recording unit 154 considers the coordinates to be a track of an identical person (hereinafter, this operation is also referred to as "identification"). When a person is identified at such coordinates at the time point t2, the flow line recording unit 154 assigns, to the second coordinates, an ID identical to the ID assigned to the first coordinates. The flow line recording unit 154 can successively update the tracking information by repeating the processing described above every time a person is identified by the location identification unit 152.

Note that, when a plurality of persons are in proximity to one another as in the case where the store is congested, there is a possibility that identification of a person by the above-described method cannot be done (or the identification is incorrectly done). In such a case, the flow line recording unit 154 may identify a person, using another method. For example, the flow line recording unit 154 may assign an ID to coordinates, based on the movement direction of a person represented by a flow line. Alternatively, the flow line recording unit 154 may assign an ID to coordinates, based on other features (color of the hair, the skin, or clothes, features of the face, the gender, and the like of a person) that can be obtained from the image data.

Figure 7:
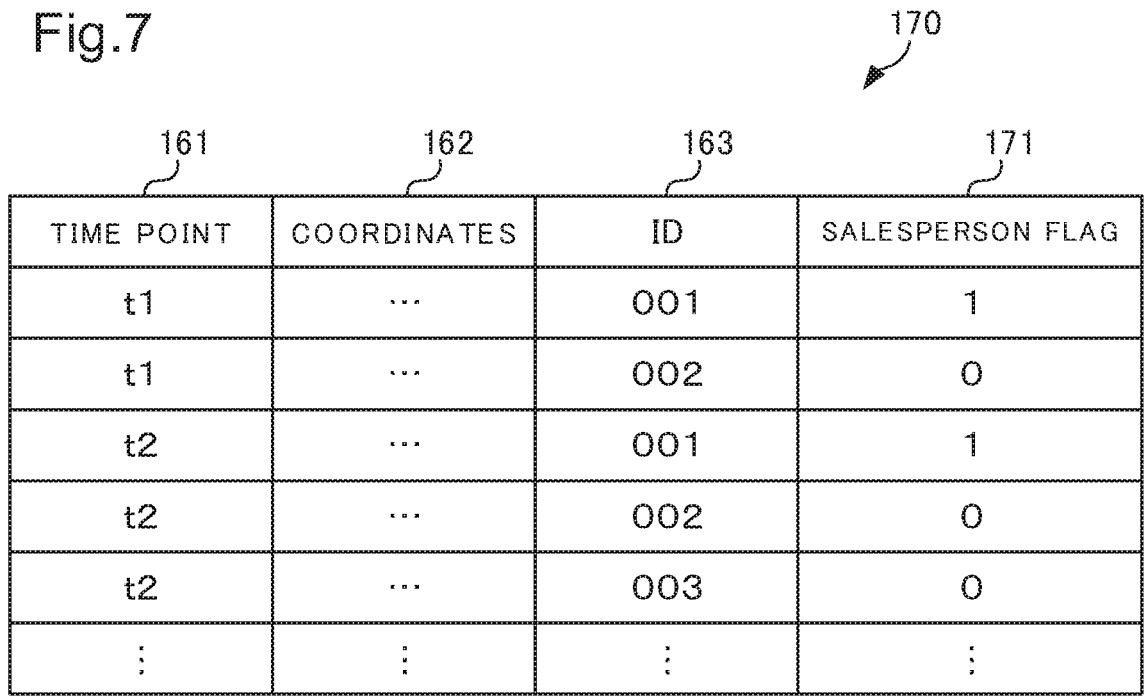
FIG. 7 illustrates another example of the data structure of the tracking information.

FIG. 7 illustrates another example of the data structure of the tracking information. In the example, tracking information 170 includes store clerk flags 171 in addition to time points 161, coordinates 162, and IDs 163, which are similar to those in the tracking information 160. Each store clerk flag 171 is a flag for distinguishing a flow line of a store clerk and a flow line of a customer from each other. Regarding the store clerk flags 171, for example, "1" and "0" are assigned to a flow line of a store clerk and a flow line of a customer, respectively.

The location identification unit 154 can discriminate between a store clerk and a customer, based on location information transmitted from a terminal device 112. For example, locations identified by the location identification unit 152 include a location of a store clerk and a location of a customer. On the other hand, the location that the location information indicates represents a location of a store clerk. Therefore, the flow line recording unit 154 can determine that, among the locations identified by the location identification unit 152, a location that coincides with a location indicated by the location information or locations the distance between which is equal to or less than a predetermined threshold value (that is, within an error range) is/are a location(s) of a store clerk. Alternatively, when the store clerks wear specific items (uniforms, name tags, and the like), the flow line recording unit 154 can discriminate between a store clerk and a customer by recognizing image features of such items from the image data.

Note that the flow line recording unit 154 does not have to discriminate between a store clerk and a customer at all time points at which tracking information is recorded. That is, the flow line recording unit 154 only has to discriminate between a store clerk and a customer at least any of time points at which tracking information is recorded with the same ID. For example, in the example in FIG. 7, when, to a flow line to which an ID "001" is assigned at a time point "t1", a store clerk flag "1" is assigned, the flow line recording unit 154 may, at a time point "t2", assign the store clerk flag "1" to a flow line to which the ID "001" is assigned without discriminating between a store clerk and a customer. Alternatively, the flow line recording unit 154 may discriminate whether a person is a store clerk or a customer at each time point and, referring to a result of the discrimination, assign an ID.

The information generation unit 155 generates deployment information. The deployment information includes at least information relating to a deployment of store clerks determined by the deployment determination unit 153. The deployment information indicates a deployment of one or a plurality of store clerks. For example, the deployment information may indicate a deployment of a specific store clerk or a deployment of all store clerk in the store.

The deployment information includes, for example, image data visually indicating a deployment of store clerks in the store. The image data indicates, for example, an image in which locations of store clerks, which were determined by the deployment determination unit 153, are plotted on the floor of the store. Alternatively, the deployment information may include coordinate information indicating the deployment of store clerks.

When there are a plurality of terminal devices 112, the information generation unit 155 may generate different deployment information for each terminal device 112, that is, for each store clerk, or generate deployment information common to all the terminal devices 112. For example, the information generation unit 155 generates, as deployment information to be transmitted to the terminal device 112 of a specific store clerk, information indicating a deployment of the store clerk.

The information output unit 156 outputs deployment information generated by the information generation unit 155. More in detail, the information output unit 156 outputs the deployment information to each terminal device 112. The deployment information output by the information output unit 156 is transmitted from the server device 111 to a terminal device 112 via the communication unit 123.

The positioning unit 157 measures a location of the terminal device 112. Any of well-known methods may be employed as a positioning method applied to the positioning unit 157. For example, when communication of the terminal device 112 is performed by means of a wireless LAN, the positioning unit 157 can measure a location of the terminal device 112, based on intensity of respective radio waves received from a plurality of access points. Such a positioning method is referred to as Wi-Fi (registered trademark) positioning or Wi-Fi positioning system (WPS). The positioning unit 157 supplies the information output unit 158 with location information indicating a measured location.

The information output unit 158 outputs location information supplied from the positioning unit 157. More in detail, the information output unit 158 outputs location information to the server device 111. The location information output by the information output unit 158 is transmitted from the terminal device 112 to the server device 111 via the communication unit 143.

The information acquisition unit 159 acquires deployment information transmitted from the server device 111. More in detail, the information acquisition unit 159 acquires deployment information output from the information output unit 156 via the communication unit 143.

The information display unit 150 performs display processing based on deployment information acquired by the information acquisition unit 159. The display processing referred to above indicates processing of making the output unit 145 display information. For example, as a result of the display processing by the information display unit 150, the output unit 145 displays an image indicating a deployment of store clerks. In addition, the output unit 145 may display an image indicating a deployment of store clerks in conjunction with a captured image captured by the camera unit 146.

The configuration of the customer service assistance system 110 is as described above. In the configuration as described above, the customer service assistance system 110, by generating and displaying deployment information, enables assistance in the customer service performed by a store clerk specifically, each server device 111, each terminal device 112, and each recording device 113 operate as described below.

Figure 8:
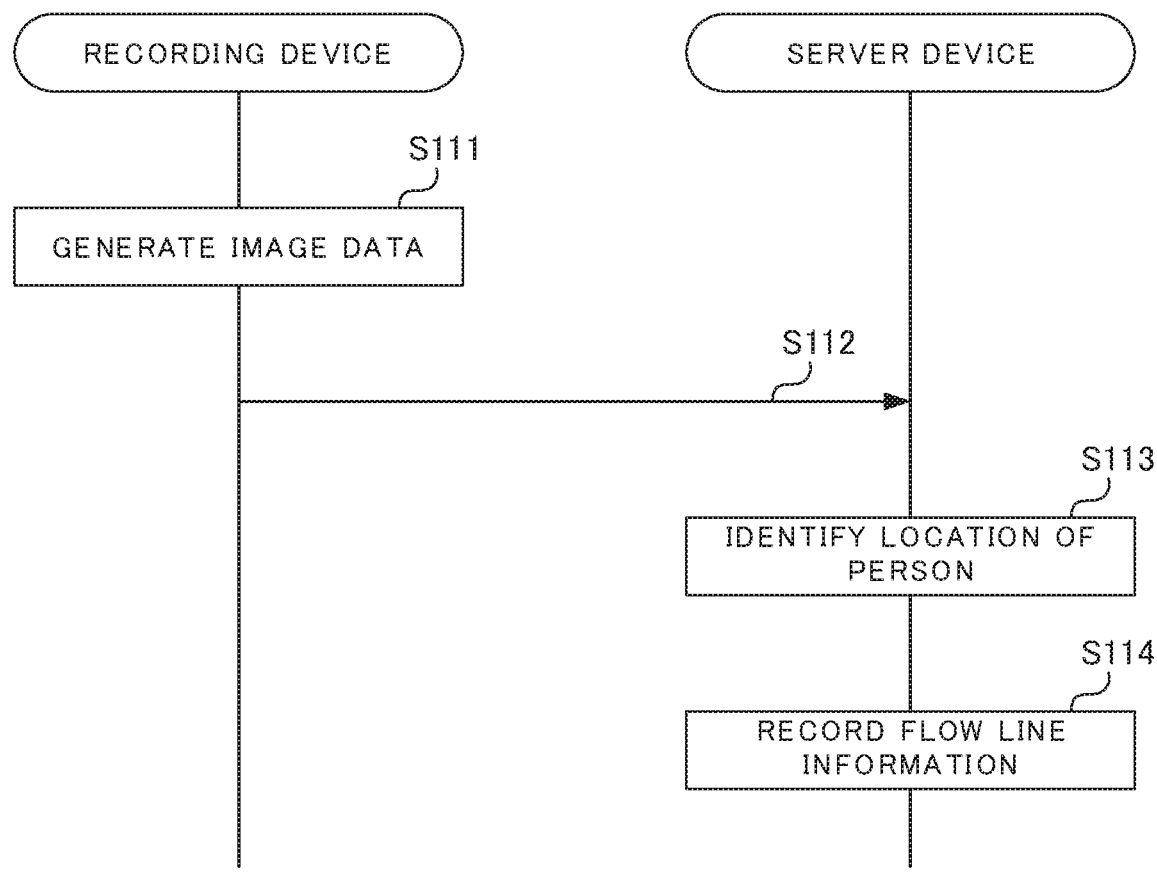
FIG. 8 is a sequence chart illustrating an example of operation of a server device and a recording device.

FIG. 8 is a sequence chart illustrating operation of a server device 111 and a recording device 113. In step S111, the recording device 113 generates image data representing a captured image. In step S112, the recording device 113 transmits the image data generated in step S111 to the server device 111. The server device 111 receives the image data transmitted by the recording device 113.

In step S113, the server device 111 identifies, based on the image data transmitted in step S112, a location of a person in the store. More in detail, the server device 111 identifies coordinates indicating a location of a person using a predetermined coordinate system. In step S114, the server device 111 records, based on the location identified in step S113, tracking information.

The server device 111, by repeating the processing in steps S113 and S114 based on image data supplied repeatedly, updates the tracking information. The tracking information, by being updated in this manner, represents transitions between locations of a person. That is, the tracking information represents how the location of a person has changed between a certain time point and the succeeding time point of the certain time point.

FIG. 9 is a sequence chart illustrating operation of a server device 111 and a terminal device 112. The server device 111 executes the following processing in parallel with the processing in FIG. 8. The server device 111 may execute processing from step S121 onward in response to a request from the terminal device 112. Upon the request, the terminal device 112 may transmit, to the server device 111, location information indicating the latest location of the device itself. Alternatively, the server device 111 may execute the processing from step S121 onward at a predetermined timing instead of in response to a request from the terminal device 112. In addition, the server device 111 may execute the processing from step S121 onward in a repeated manner (for example, every several seconds).

In step S121, the server device 111 executes deployment determination processing, to be described later. The deployment determination processing is executed by the deployment determination unit 153 of the server device 111. The server device 111 executes the deployment determination processing, using the tracking information recorded by the processing in FIG. 8.

In step S122, the server device 111 generates deployment information indicating a deployment of store clerks, which was determined in the deployment determination processing in step S121. In step S123, the server device 111 transmits the deployment information generated in step S122 to the terminal device 112. The terminal device 112 receives the deployment information transmitted by the server device 111.

Note that, in step S123, the server device 111 may transmit the deployment information to a plurality of terminal devices 112. When, as described above, the server device 111 transmits the deployment information to a plurality of terminal devices 112, the server device 111 may generate different deployment information for each terminal device 112.

In step S124, the terminal device 112 displays an image based on the deployment information. The terminal device 112 presents a target location to a store clerk who is the user of the device itself. On this occasion, the terminal device 112 may display not only a target location but also a route from the present location of the store clerk to the target location and thereby guide the store clerk. In addition, the store clerk, using the image based on the deployment information as a reference, determines a location of the store clerk himself/herself in the store. On this occasion, the store clerk, while moving around as needed basis, prepares for performing customer service activity (sales talk and the like) to customers and pays attention to customers around the store clerk.

FIG. 10 is a flowchart illustrating an example of the deployment determination processing in step S121. Note that it is assumed that, in the following example, the number of customers are greater than the number of store clerks. When the number of customers is smaller than the number of store clerks, since one or more store clerks are able to serve each customer, assistance by the customer service assistance system 110 of the present example embodiment is not necessary. In addition, the following example is an example when the deployment determination unit 153 does not refer to layout information.

In step S1211, the deployment determination unit 153 identifies locations and the number of customers. In addition, in step S1212, the deployment determination unit 153 identifies locations and the number of store clerks. Note that the execution sequence of steps S1211 and S1212 is not limited to the exemplification in FIG. 10 and may be reversed.

The deployment determination unit 153 identifies locations and the number of customers, based on tracking information. The deployment determination unit 153, using tracking information recorded at the latest time point among the tracking information recorded by the flow line recording unit 154, identifies locations and the number of customers at the time point. Therefore, the number of customers referred to above does not include the number of customers who have already left the store.

The deployment determination unit 153 identifies locations and the number of customers, based on location information. Alternatively, when tracking information of (not only customers but also) store clerks is recorded by the flow line recording unit 154, the deployment determination unit 153 identifies locations and the number of store clerks, based on the tracking information. In this case, the deployment determination unit 153, using store clerk flags (see FIG. 7), distinguishes store clerks and customers from each other.

When the locations and the numbers of store clerks and customers are identified, the deployment determination unit 153 determines customers to be allocated to respective store clerks in accordance with a predetermined criterion in step S1213. In some cases, the deployment determination unit 153 allocates customers to store clerks in such a way that a uniform number of customers are allocated to each store clerk. Note, however, that the number of customers allocated to each store clerk may vary.

For example, the deployment determination unit 153 may determine the number of customers allocated to each store clerk, based on locational relationships between the store clerks and the customers. More specifically, the deployment determination unit 153 may allocate a greater number of customers to a store clerk around whom a greater number of customers are present. This configuration enables store clerks to be prevented from concentrating in an area that is congested with customers in the store.

Note that the deployment determination unit 153 allocates each of the customers identified in step S1211 to any of the store clerks. That is, the deployment determination unit 153 determines allocation of customers in such a way that no customer is left unallocated to any of the store clerks. On the other hand, the deployment determination unit 153 may allocate customers in such a way as to produce a customer whose allocation is duplicated, such as allocating a customer to a plurality of store clerks.

In step S1214, the deployment determination unit 153 determines a deployment of the store clerks in accordance with the allocation determined in step S1213. For example, the deployment determination unit 153 may calculate, with respect to each store clerk, a location at which the distances between the location and a plurality of customers allocated to the store clerk become the same distance. Alternatively, the deployment determination unit 153 may calculate a location at which the distance between the store clerk and customers is minimized. In addition, the deployment determination unit 153 may determine a deployment of the store clerks, using layout information.

Figure 11A:
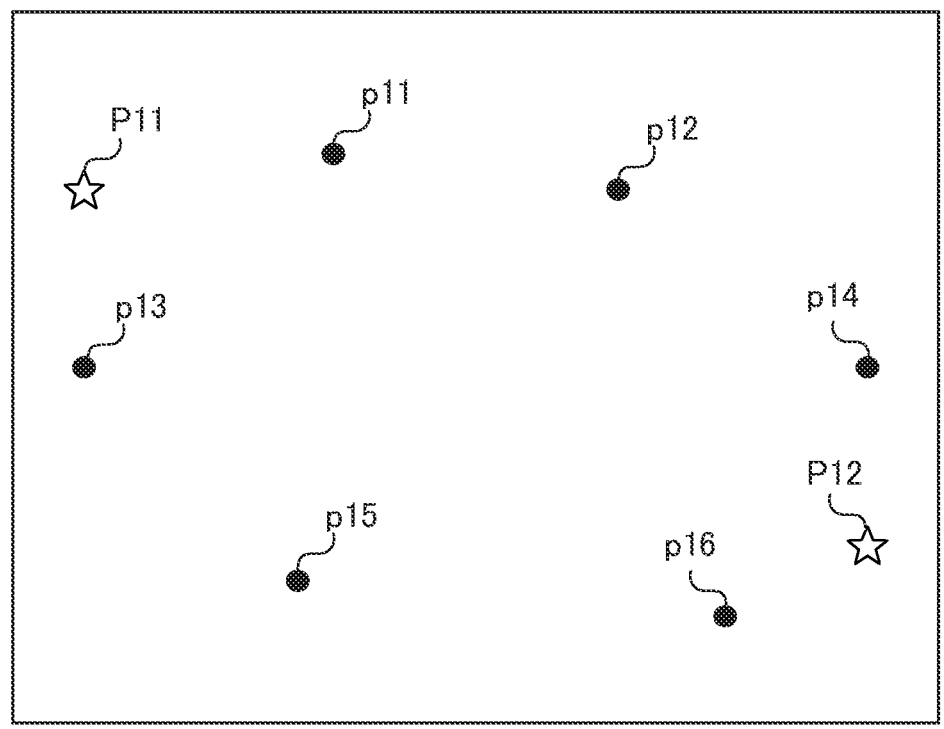
FIG. 11A is a first drawing illustrating an example of a procedure of the deployment determination processing.
Figure 11B:
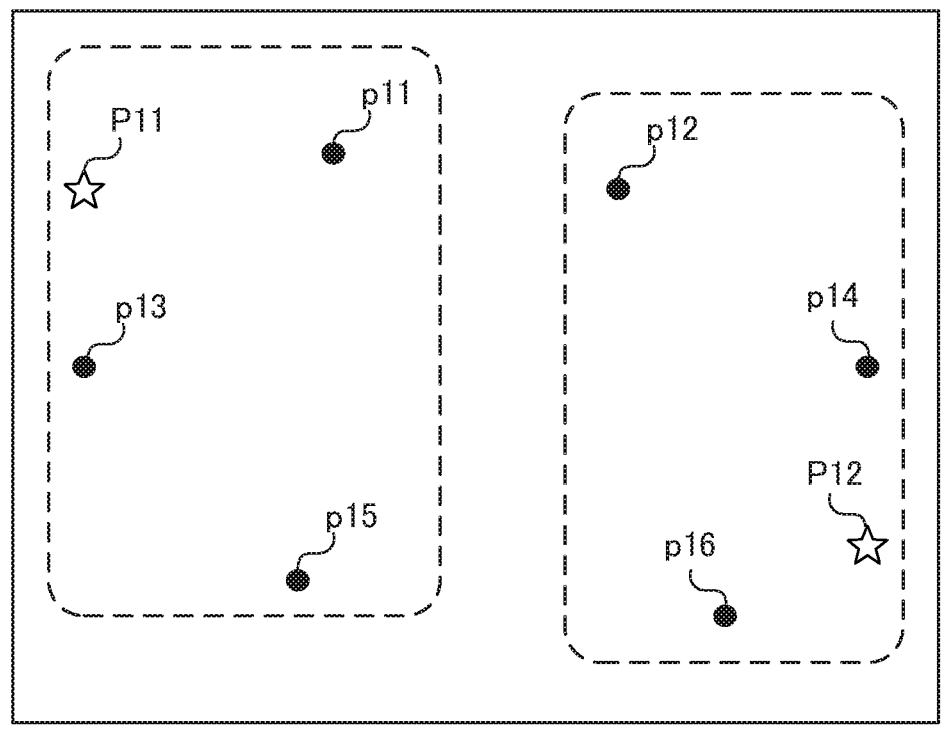
FIG. 11B is a second drawing illustrating the example of the procedure of the deployment determination processing.
Figure 11C:
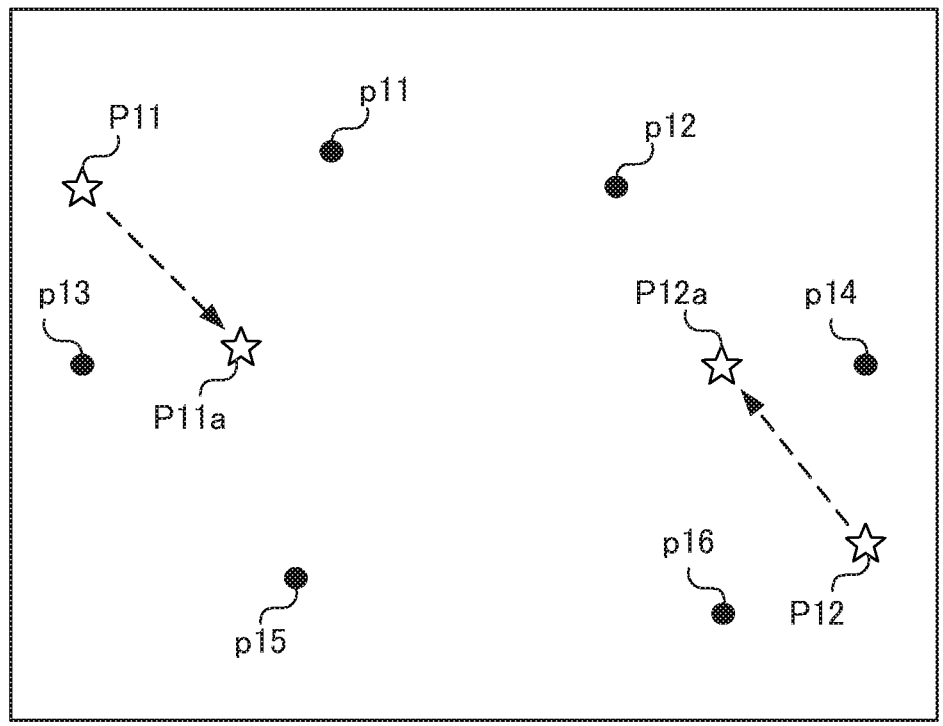
FIG. 11C is a third drawing illustrating the example of the procedure of the deployment determination processing.

FIGS. 11A to 11C exemplifies a specific procedure of the deployment determination processing. FIG. 11A illustrates an example of locations of store clerks and customers at a time point. In this example, it is assumed that store clerks are present at locations P11 and P12. That is, the number of store clerks is two in this case. It is assumed that customers are present at locations p11, p12, p13, p14, p15, and p16. That is, the number of customers is six in this case.

FIG. 11B illustrates an allocation of the customers to the store clerks in the example in FIG. 11A. In this example, since two store clerks and six customers are present, the deployment determination unit 153 determines the number of customers to be allocated per store clerk to be three. Therefore, the deployment determination unit 153 respectively allocates three customers to the store clerks present at the locations P11 and P12. Specifically, the deployment determination unit 153 calculates distances between the respective store clerks and the respective customers and allocates three customers to each store clerk in ascending order of the distances (that is, in descending order of proximity). In the example in FIG. 11A, the deployment determination unit 153 allocates the customers at the locations p11, p13, and p15 and at the locations p12, p14, and p16 to the store clerks at the locations P11 and P12, respectively.

FIG. 11C illustrates a deployment of the store clerks in the example in FIG. 11A. In this example, the deployment determination unit 153 determines a deployment of the respective store clerks in such a way that each store clerk is able to easily approach the customers allocated to the store clerk. Specifically, the deployment determination unit 153 determines target locations of the store clerks present at the locations P11 and P12 to be locations P11a and P12a, respectively. The target location P11a is equivalent to the centroid of a triangle with vertices at the locations p11, p13, and p15. In addition, the target location P12a is equivalent to the centroid of a triangle with vertices at the locations p12, p14, and p16.

Note that the centroid of a triangle in the above-described example is an example of the target location. The target location may be another point defined based on a triangle, such as the inner center and the circumcenter, or still another point on the inside (inner side) of a triangle. In addition, even when the number of customers allocated to a store clerk is four or more, the deployment determination unit 153 can determine a target location in a similar manner. The deployment determination processing can also be applied to such a case by changing the term "triangle" to "polygon".

Figure 12:
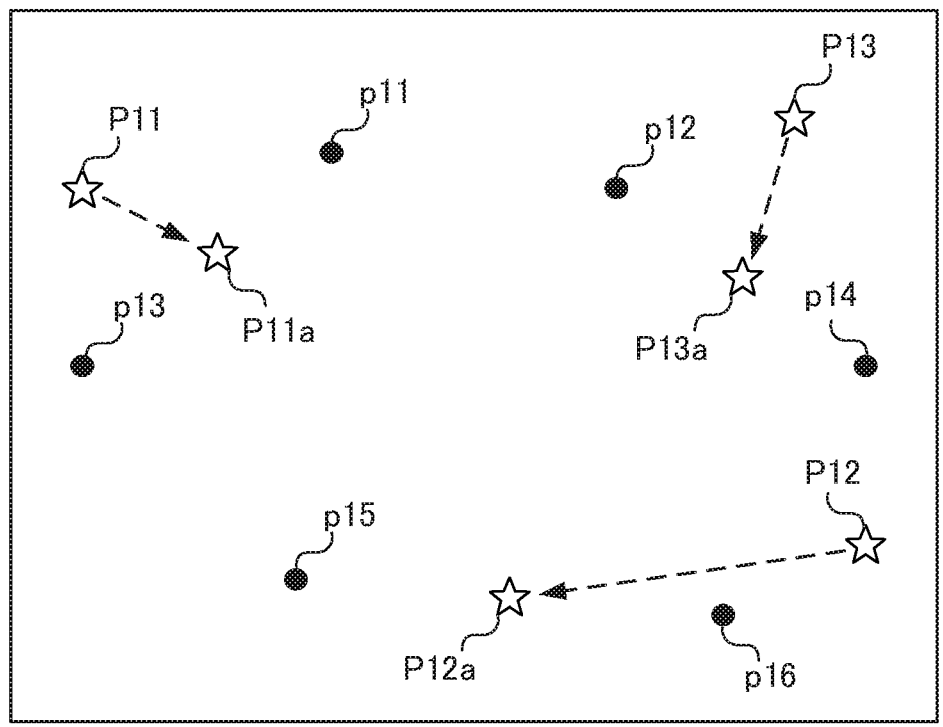
FIG. 12 illustrates an example of a deployment of store clerks.

FIG. 12 illustrates another example of the deployment of store clerks. Compared with FIGS. 11A to 11C, although the number and locations of customers are the same, the number of store clerks is different. In this example, the number of store clerks is three. In this case, it is assumed that three store clerks are present at locations P11, P12, and P13.

Since the deployment determination unit 153 allocates six customers to three store clerks, the deployment determination unit 153 allocates two customers per store clerk. For example, the deployment determination unit 153 determines target locations of the store clerks in this case to be locations P11a, P12a, and P13a. The target location P11a is equivalent to the middle point between the locations p11 and p13. The target location P12a is equivalent to the middle point between the locations p15 and p16. The target location P13a is equivalent to the middle point between the locations p12 and p14.

Figure 13:
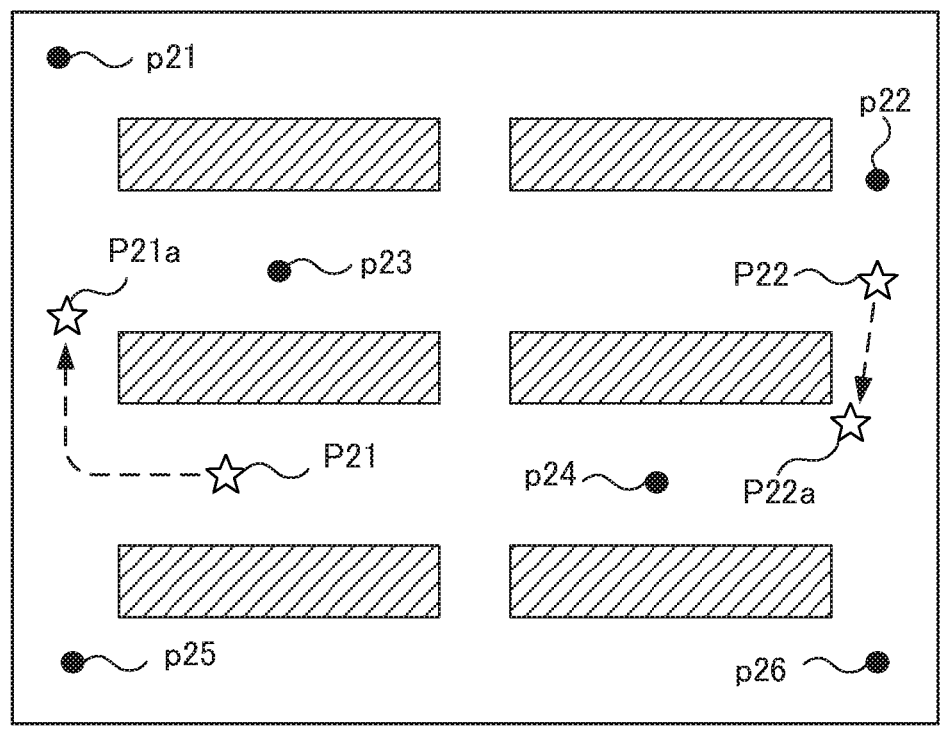
FIG. 13 illustrates an example of a deployment of store clerks based on layout information.

FIG. 13 illustrates an example of a deployment of store clerks when the deployment determination unit 153 refers to layout information. In this example, it is assumed that customers are present at locations p21, p22, p23, p24, p25, and p26. It is also assumed that store clerks are present at locations P21 and P22. That is, the numbers of customers and store clerks are six and two, respectively. In addition, in this example, it is assumed that obstacles, such as store shelves, exist at portions illustrated by hatching. The layout information indicates locations of such obstacles in the store.

In this example, the deployment determination unit 153 determines target locations of the store clerks to be locations P21a and P22a. On this occasion, the deployment determination unit 153 determines target locations in such a way that no line segment connecting a target location and the location of a customer overlaps an obstacle (that is, a portion illustrated by hatching). In other words, the deployment determination unit 153 determines a target location in such a way that a store clerk can see all customers allocated to the store clerk without being obstructed by any obstacle. For example, the store clerk who was present at the location P21, by moving to the target location P21a, becomes able to visually recognize the customers who are present at the locations p21, p23, and p25 and whom the store clerk has been obstructed from seeing by obstacles up to that time. When configured in such a manner, store clerks can be deployed effectively even when visual recognition of customers is restricted by obstacles.

Each terminal device 112 displays an image based on deployment information. The terminal device 112 displays an image, such as FIG. 11C, in which target locations of store clerks are displayed on a floor map of the store in a superimposed manner. The terminal device 112 may display, in addition to the target locations of the store clerks, the latest locations of the store clerks or customers.

The image display by the terminal devices 112 may be customized for each store clerk. For example, when present locations or target locations of a plurality of store clerks are to be displayed, each terminal device 112 may display a store clerk who is the user of the terminal device 112 in a distinguishable manner from other store clerks, using colors or symbols. In addition, each terminal device 112 may display customers allocated to a store clerk who is the user of the terminal device 112 in a distinguishable manner from other customers, using colors or symbols. Moreover, each terminal device 112 may display a portion (for example, a vicinity of the terminal device 112) of the floor map instead of the whole of the store.

As described above, the customer service assistance system 110 according to the present example embodiment is capable of, by providing a store clerk with service based on the location information of customers (location-based service), assisting the customer service activity of the store clerk. More in detail, the customer service assistance system 110 is capable of assisting the customer service activity through deployment information according to the numbers and locations of store clerks and customers. Therefore, the customer service assistance system 110 enables a limited number of store clerks (that is, human resources) to be deployed effectively in the store.

For example, when a store has a vast floor, store clerks sometimes cannot pay attention to all customers. In addition, from the viewpoint of store management (in particular, personnel expenses), there are, in general, needs that increasing the number of personnel more than necessary is undesirable. However, excessively reducing the number of store clerks performing customer service causes the situation in which the store clerks cannot pay attention to all customers to sometimes occur.

Effective customer service, that is, timely customer service, performed by store clerks may substantially influence purchase behavior or satisfaction of customers. For example, when a customer cannot decide whether or not to purchase a product, detailed explanation of the product or sales talk by a store clerk often becomes a decisive factor for decision by the customer to purchase the product. On the other hand, when, despite that a customer wants to have explanation of a product, no store clerk who can serve the customer is present close to the customer, there is a possibility that purchase intention of the customer is lost or satisfaction of the customer with the store is reduced.

The customer service assistance system 110 of the present example embodiment makes it possible to, using a given number of store clerks, allocate one or more store clerks to all customers who are present in the store on that occasion. In addition, each store clerk can get to know customers allocated to the store clerk and/or a location (target location) at which the store clerk can easily approach customers allocated to the store clerk. Therefore, each store clerk becomes able to easily provide customer service to more store clerks evenly than a case where the configuration of the present example embodiment is not used.

1.2: Variations of First Example Embodiment

To the customer service assistance system 110 according to the present example embodiment, the following variations are applicable. These variations may be applied in combination as needed basis. In addition, these variations may be applied to not only the present example embodiment but also other example embodiments to be described later.

(1) The server device 111 may transmit deployment information to, in place of a terminal device 112, another specific device. The specific device referred to above is used by a person (hereinafter, also referred to as a "director") who remotely directs store clerks performing customer service. In this case, the director, referring to an image based on the deployment information, directs store clerks in the store to take up their positions, using wireless equipment, such as a transceiver.

(2) The deployment determination unit 153 may determine a deployment of store clerks, based on locations of customers allocated to store clerks and fields of vision of the store clerks. For example, the deployment determination unit 153 may determine a deployment of a store clerk in such a way that, even without largely rotating the neck or body, the store clerk can visually recognize customers allocated to the store clerk. Note that a field of vision in the horizontal direction of a human being, in general, covers a range of angle of approximately 180° to 200°.

Store clerks generally cannot visually recognize the front and back at the same time. Therefore, when a plurality of customers are allocated to a store clerk, it can be said that the store clerk can more easily recognize the customers when being deployed to a location at which customers are present together on one side (in particular, the front side) of the store clerk than when being deployed to a location at which customers are present on both the front side and the back side of the store clerk. Thus, the deployment determination unit 153 determines a target location of a customer in such a way that all customers allocated to the store clerk can be visually recognized at the same time (that is, within a range of a field of vision). Specifically, the deployment determination unit 153 may determine a target location of a store clerk in such a way that all customers allocated to the store clerk fall within a predetermined range of angle (for example, 180°), which is equivalent to a field of vision from the target location.

(3) The deployment determination unit 153 may vary the number of customers allocated per store clerk. For example, the deployment determination unit 153 may vary the number of customers allocated per store clerk according to an attribute (for example, customer service skill) of each store clerk. The customer service skill referred to above is determined based on years of employment and a job position (store manager, regular employee, part-timer, or the like) in the store. In this case, each terminal device 112 transmits location information and information indicating customer service skill to the server device 111. The deployment determination unit 153 allocates more customers to a store clerk who has higher customer service skill. Note that the information indicating customer service skill may be included in tracking information as attribute information, to be described later.

In addition, the deployment determination unit 153 may group a plurality of customers satisfying a predetermined condition and allocate the group to an identical store clerk. The predetermined conditions referred to above include, for example, a condition requiring mutual distances between the plurality of customers to be equal to or less than a predetermined threshold value (that is, the customers are close to one another) and a condition requiring the mutual distances to have been kept at short distances for a predetermined period. Customers satisfying such a condition have a high possibility of being a group of people who behave together, such as family members and friends. One store clerk can collectively serve such a group of people.

When there is a group of customers satisfying such a condition, the deployment determination unit 153 may consider the number of customers in the group to be smaller than the actual number. For example, when there is a group of four customers satisfying such a condition, the deployment determination unit 153 may count the number of customers in the group as one or two. Alternatively, the deployment determination unit 153 may allocate more customers to a store clerk to whom a group of customers satisfying such a condition is allocated than those allocated to other store clerks. When configured in such a manner, it is possible to allocate store clerks more effectively.

(4) The deployment determination unit 153 can determine a deployment of store clerks, based on the tracking information of customers. More in detail, the deployment determination unit 153 may identify, based on tracking information of each customer, at least either movement speed or a movement direction of the customer and, based on the identified movement speed or movement directions, determine a deployment of store clerks. The deployment determination unit 153 may, in particular, determine a deployment of store clerks, based on, among the tracking information of each customer, information indicating past locations of the customer.

Customers in the store include customers who require customer service and customers who do not. For example, a customer who is just moving along an aisle has a low possibility of requiring customer service from a store clerk. On the other hand, a customer who has been standing at the same location for a long time or has been going back and forth within a certain area has a high possibility of requiring customer service from a store clerk. Therefore, behavior of a customer indicated by tracking information can be said to be able to suggest the necessity of customer service for the customer.

The deployment determination unit 153 can determine a deployment of store clerks, based on such necessity for customer service. For example, the deployment determination unit 153 may determine a target location of a store clerk in such a way that a distance to a customer having a high necessity for customer service becomes smaller than a distance to a customer having a low necessity for customer service. In other words, the deployment determination unit 153 can be said to be able to assign a weight to a distance between a store clerk and a customer according to behavior of the customer identified based on tracking information. Note that behavior of a customer may be identified based on behavior information to be described later.

(5) The deployment determination unit 153 may, upon deployment of store clerks, restrict the target location of a store clerk to a certain range. For example, the deployment determination unit 153 may restrict the range of target location in such a way that movement distance of a store clerk from the original location (latest location) to a target location of the store clerk becomes equal to or less than a predetermined threshold value. Alternatively, when each store clerk is assigned to a predetermined area (for example, a sales space of which the store clerk is in charge), the deployment determination unit 153 restrict the target location of a store clerk within an area to which the store clerk is assigned. When configured in such a manner, it is possible to apply a certain restriction to the deployment of store clerks.

(6) When tracking information of customers and tracking information of store clerks are included in the tracking information, the deployment determination unit 153 may exclude a pair of a store clerk and a customer the locational relationship between which satisfies a predetermined condition from identification targets. The predetermined conditions referred to above include, for example, a condition requiring a distance between a store clerk and a customer to be equal to or less than a predetermined threshold value (that is, the store clerk and the customer are close to each other) and a condition requiring a distance between a store clerk and a customer to have been kept at a short distance for a predetermined period.

When such a condition is satisfied, the store clerk has a high possibility of being serving a customer who is present close to the store clerk. Thus, the customer also has a high possibility of having already been served. Therefore, the deployment determination unit 153 excludes a store clerk and a customer satisfying such a condition from the customers and store clerks identified in steps S1211 and S1212 and executes processing in steps S1213 and S1214. When configured in such a manner, it is possible to determine a deployment of other store clerks without obstructing customer service activity performed by a store clerk who has already been serving a customer. In addition, when configured in such a manner, it is possible not to allocate another store clerk to a customer who has already been served by a store clerk.

(7) The positioning unit 157 may measure a location of a terminal device 112, using another positioning system for indoor or outdoor use. For example, the positioning unit 157 may use a global navigation satellite system (GNSS), such as a global positioning system (GPS). In addition, as a positioning system for indoor use, an indoor messaging system (IMES), a positioning system using Bluetooth (registered trademark), a positioning system using geomagnetism, and the like are known. Moreover, the positioning unit 157 may measure a location, using sensor data output by the sensor unit 127. The positioning unit 157 may measure a location, using a plurality of positioning systems in combination. For example, the positioning unit 157 may perform positioning using the Wi-Fi positioning and the PDR in combination.

(8) Each terminal device 112 does not have to include the positioning unit 157. In this case, the information output unit 158 is configured to output, in place of location information, information required for positioning of the terminal device 112. The information required for positioning of the terminal device 112 is, in the case of, for example, the Wi-Fi positioning, information indicating intensity of respective radio waves received from a plurality of access points. Alternatively, the information required for positioning of the terminal device 112 can include sensor data output from the sensor unit 127.

In this variation, the server device 111 identifies a location of each terminal device 112, based on the information required for positioning of the terminal device 112. That is, in this case, it can also be said that the server device 111 has a function (function of identifying a location of the terminal device 112) equivalent to the positioning unit 157.

Alternatively, the information required for positioning of the terminal device 112 may be transmitted to a positioning device different from both the server device 111 and the terminal device 112. The positioning device identifies a location of the terminal device 112, based on the information required for positioning of the terminal device 112 and transmits location information representing the identified location to the server device 111. In this case, the server device 111 does not have to include a function equivalent to the positioning unit 157 and is only required to receive location information from the positioning device.

(9) Tracking information may include, in addition to the information exemplified in FIGS. 6 and 7, any other information that can be associated with a movement trajectory. For example, tracking information may include attribute information indicating an attribute of a person and behavior information indicating behavior of a person. The attribute information and the behavior information may be included only in the tracking information of a customer or included in both the tracking information of a customer and the tracking information of a store clerk. The information generation unit 155 may generate deployment information including such attribute information or behavior information (for example, deployment information from which attribute information or behavior information of a customer can be displayed at a location of the customer).

The attribute information, for example, indicates characteristics of a person recognizable from an image captured by a recording device 113. Specifically, the attribute information may indicate the gender of a person, an age group (child, adult, and the like), the color of clothes, and the like. In addition, the store clerk flags 171 in FIG. 7 can be said to be information indicating which group among a plurality of groups, that is, "store clerks" and "customers", a person belongs to. Therefore, the store clerk flags 171 can be said to be equivalent to an example of the attribute information.

The behavior information, for example, indicates a gesture or behavior in front of shelves of a person. The behavior in front of shelves described above means characteristic behavior performed by a customer around store shelves. The behavior in front of shelves includes an action of picking up a product from a store shelf, an action of stopping in front of a store shelf, an action of going back and forth in front of a store shelf, and the like. In addition, the gestures can include a gesture unique to either store clerks or customers. For example, a motion of bowing can be said to be a gesture unique to store clerks. The behavior information is, for example, recognizable from an image captured by a recording device 113.

By referring to deployment information including attribute information, a store clerk is able to, for example, discriminate a customer allocated to the store clerk more easily. In addition, by referring to deployment information including behavior information, the store clerk is able to carry out customer service activity tailored to each customer. For example, by knowing a product that a customer picked up and an area where the customer stopped, the store clerk is able to obtain a clue to know interests and concerns of the customer.

(10) Image data corresponding to an image based on deployment information may be generated by either the server device 111 or the terminal device 112. That is, deployment information transmitted from the server device 111 may include coordinate information indicating locations of customers and store clerks or may include image data representing an image to be displayed on the terminal device 112. In addition, when generating such image data, the terminal device 112 may store map information in the storage unit 122 in advance or receive map information from the server device 111.

(11) Each recording device 113 can be replaced with another device (hereinafter, also referred to as "measurement device") capable of measuring a location of a person. For example, when a customer holds a transmitter that transmits a predetermined signal (a beacon or the like), the measurement device referred to above may be a receiver that receives the signal. Alternatively, the measurement device may be an optical sensor that measures a location of a person by means of a laser beam or an infrared ray and may include a so-called distance image sensor. In addition, the measurement device may include a pressure sensor that detects change in pressure (that is, weight) on the floor surface of the store and may measure a location of a person, based on output from the pressure sensor. Further, the measurement device may measure a location of a person by combining a plurality of positioning methods.

(12) Location information may be transmitted from, in place of a terminal device 112, an electronic device or a wireless tag that is held by a store clerk and is associated with the terminal device 112. When a terminal device 112 is held by a store clerk such location information can be said to indicate a location of the terminal device 112 and a location of the store clerk holding the terminal device 112.

(13) The data structures of map information and tracking information are not limited to the exemplified structures. The map information and the tracking information may have well-known or other similar data structures. In addition, areas in the map information may be defined based on the arrangement of store fixtures, such as store shelves and display counters, or based on the arrangement of products themselves.

2: Second Example Embodiment

Figure 14:
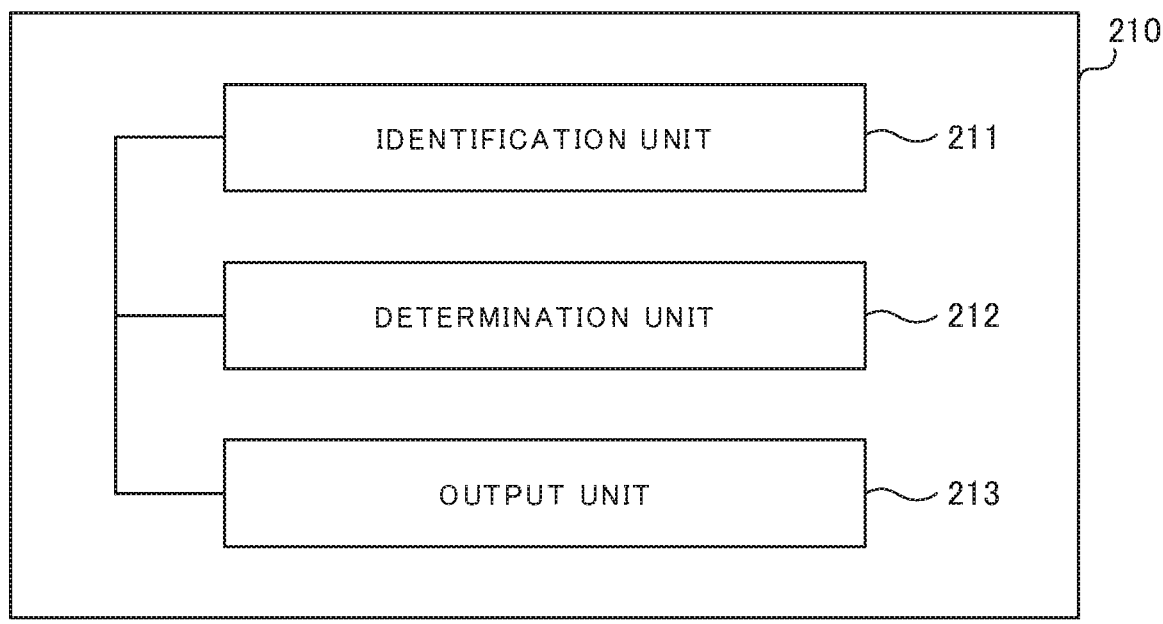
FIG. 14 is a block diagram illustrating an example of a configuration of an information processing device.

FIG. 14 is a block diagram illustrating a configuration of an information processing device 210 according to another example embodiment. The information processing device 210 is a computer device for assisting customer service performed by a store clerk in a store. The information processing device 210 can be said to be a server device in a client-server model. The information processing device 210 includes an identification unit 211, a determination unit 212, and an output unit 213.

Note that, among the terms to be used in the following example embodiments and variations, terms that were also used in the first example embodiment are, unless otherwise stated, used in the same meanings as the terms used in the first example embodiment.

The identification unit 211 identifies locations of customers in a space, such as a store. In some cases, the identification unit 211 is capable of identifying locations of customers, based on information indicating locations of customers. In the example embodiment, the information indicating locations of customers indicates locations of customers explicitly or implicitly. In other words, the information indicating locations of customers may be information representing the locations themselves of customers (that is, indicating the locations explicitly) or may be information from which the locations of customers are, as a result of predetermined operation and processing, identified (that is, indicating the locations implicitly).

The identification unit 211 may identify, in place of locations of customers themselves, locations of objects traveling with the customers. For example, the identification unit 211 may identify a location of an electronic device or the like that a customer wears. Alternatively, when a customer shops, pushing a shopping cart, the identification unit 211 may identify a location of the shopping cart that the customer is pushing. In this case, a transmitter transmitting a beacon may be attached to the shopping cart, or a marker that differs for each shopping cart may be pasted to the shopping cart. That is, an object the location of which the identification unit 211 identifies is not limited to a customer himself/herself and may be an object that can be said to be located at a substantially identical location to that of a customer.

The determination unit 212 determines a deployment of store clerks. The determination unit 212 can be said to determine a location at which each store clerk should be deployed, that is, a target location. The determination unit 212 determines a deployment of store clerks, based on at least the number of store clerks and locations of customers identified by the identification unit 211. The determination unit 212 may determine target locations of store clerks, based on, in addition to the number of store clerks and locations of customers, locations of the store clerks.

The output unit 213 outputs deployment information that indicates a deployment of store clerks generated by the determination unit 212. The deployment information may, as with the first example embodiment, include image data and/or coordinate information. In addition, a device (destination) to which the output unit 213 outputs deployment information is not always limited to a specific device. The output unit 213 can transmit deployment information to one or a plurality of devices.

Figure 15:
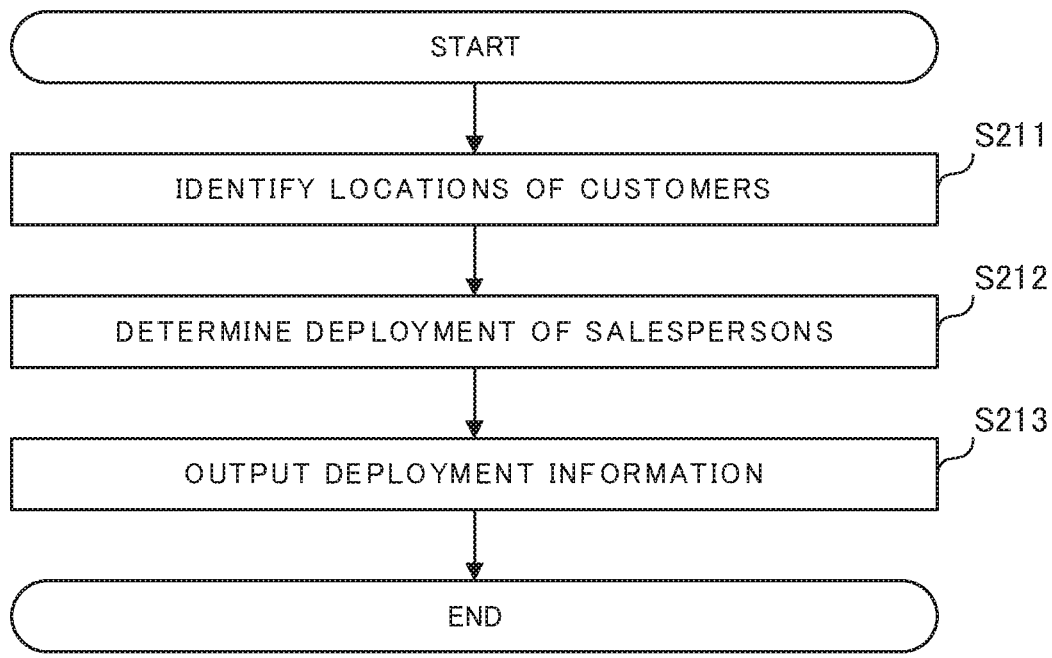
FIG. 15 is a flowchart illustrating an example of operation of a information processing device.

FIG. 15 is a flowchart illustrating operation of the information processing device 210. In step S211, the identification unit 211 identifies locations of customers in a space. In step S212, the determination unit 212 determines a deployment of store clerks, based on the number of store clerks and the locations of the customers identified in step S211. In step S213, the output unit 213 outputs deployment information indicating the deployment of the store clerks identified in step S212, According to the information processing device 210 according to the present example embodiment, deployment information based on the number of store clerks and locations of customers is output. Therefore, the information processing device 210 can produce similar operational effects to those of the customer service assistance system 110 of the first example embodiment.

Note that the information processing device 210 corresponds to the server device 111 of the first example embodiment. Specifically, the identification unit 211 corresponds to the location identification unit 152. The determination unit 212 corresponds to the deployment determination unit 153. The output unit 213 corresponds to the information output unit 156. In addition, the information processing device 210 may be configured to further include components equivalent to the information acquisition unit 151, the flow line recording unit 154, and the information generation unit 155 of the server device 111.

3: Third Example Embodiment

Figure 16:
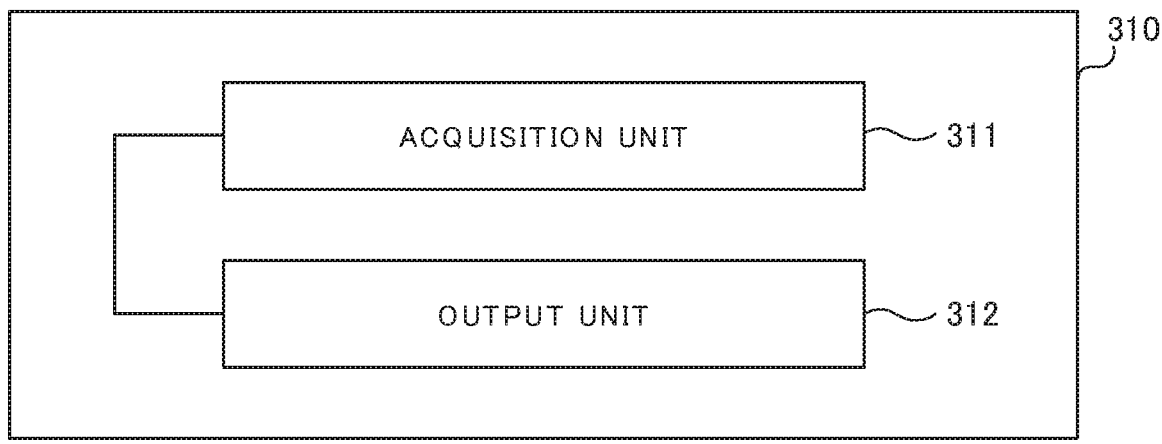
FIG. 16 is a block diagram illustrating an example of a configuration of the terminal device.

FIG. 16 is a block diagram illustrating a configuration of a terminal device 310 according to still another example embodiment. The terminal device 310 is a computer device for assisting customer service performed by a store clerk in a store. For example, the terminal device 112 in the first example embodiment is equivalent to an example of the terminal device 310. The terminal device 310 may be used in such a manner as to, collaborating with the information processing device 210 of the second example embodiment, transmit and receive data to and from each other. The terminal device 310 can be said to be a client device in a client-server model. The terminal device 310 includes at least an acquisition unit 311 and an output unit 312.

The acquisition unit 311 acquires information indicating a deployment of store clerks determined based on locations of customers and the number of store clerks in a space. The information corresponds to deployment information in the second example embodiment. When the terminal device 310 is associated with a specific store clerk, the acquisition unit 311 may acquire information indicating a deployment of the specific store clerk or acquire information indicating a deployment of store clerks also including store clerks other than the specific store clerk. Alternatively, the information indicating a deployment of store clerks may include information indicating locations of respective store clerks and identification information (ID) identifying the store clerks.

The output unit 312 outputs information acquired by the acquisition unit 311. In some cases, the output unit 312 displays the information acquired by the acquisition unit 311. Note, however, that the output referred to above can, as with the first example embodiment, include perceptible output other than display.

Figure 17:
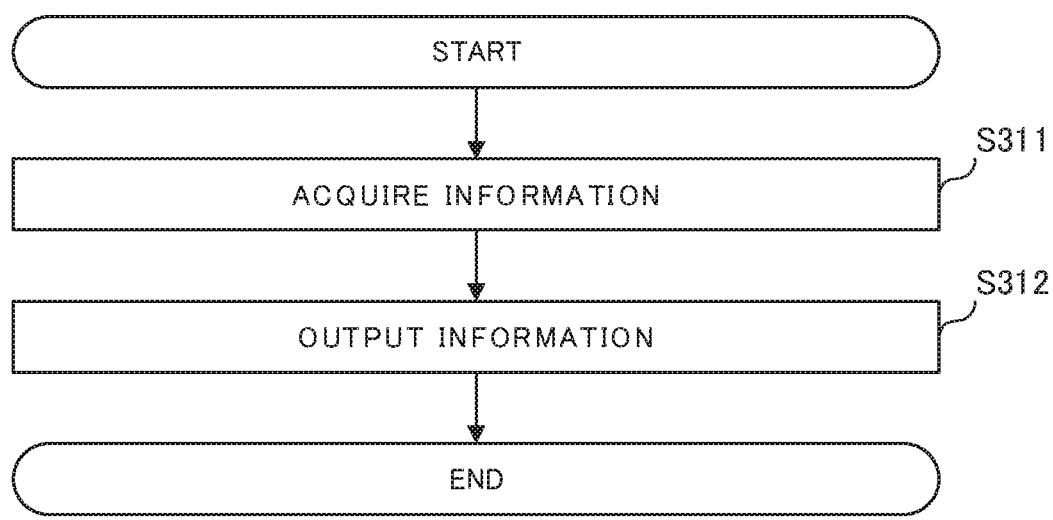
FIG. 17 is a flowchart illustrating an example of operation of a terminal device.

FIG. 17 is a flowchart illustrating operation of the terminal device 310. In step S311, the acquisition unit 311 acquires information indicating a deployment of store clerks determined based on locations of customers and the number of store clerks in a space. In step S312, the output unit 312 outputs the information acquired in step S311. For example, the output unit 312 displays an image (a map or the like) indicating a deployment of store clerks, based on the information acquired in step S311. In this case, the output unit 312 may display a location of a specific store clerk and locations of other store clerks in a distinguishable manner from each other.

The terminal device 310 according to the present example embodiment enables information according to locations of customers and the number of store clerks to be output. Therefore, the terminal device 310 can produce similar operational effects to those of the customer service assistance system 110 of the first example embodiment.

Note that the terminal device 310 corresponds to a terminal device 112 of the first example embodiment. Specifically, the acquisition unit 311 corresponds to the information acquisition unit 159. The output unit 312 corresponds to the information display unit 150 or the information output unit 158. In addition, the terminal device 310 may be configured to further include components equivalent to the positioning unit 157 of the terminal device 112.

4: Variations

To the above-described first to third example embodiments, for example, variations as described below can be applied. These variations may be appropriately combined as needed basis.

(1) Specific hardware configurations of the devices according to the present disclosure (the server device 111, the terminal device 112, and the information processing device 210) include various variations and are not limited to a specific configuration. For example, the devices according to the present disclosure may be achieved using software or may be configured in such a way that various types of processing are divided among a plurality of pieces of hardware.

Figure 18:
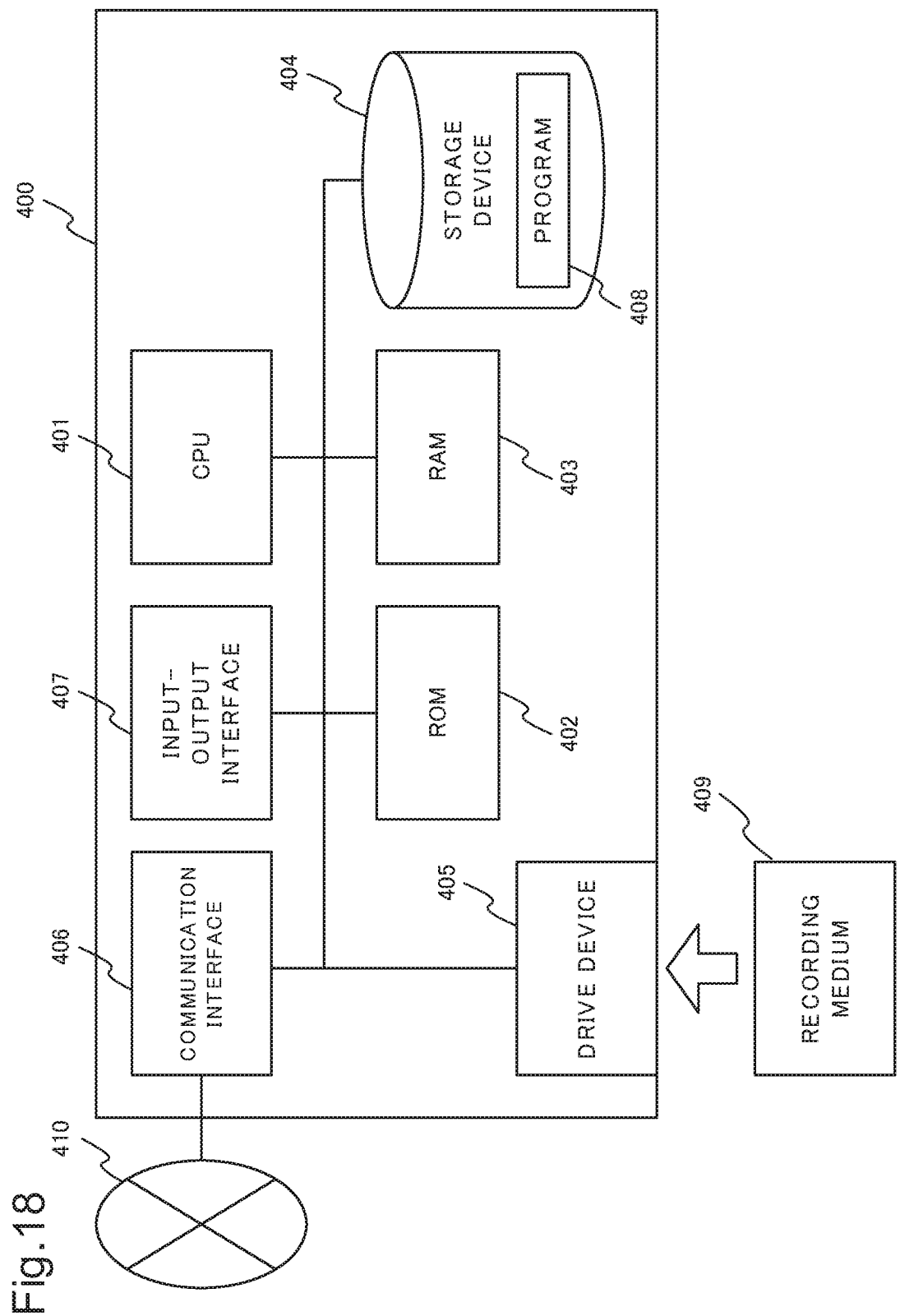
FIG. 18 is a block diagram illustrating an example of a hardware configuration of a computer device.

FIG. 18 is a block diagram illustrating an example of a hardware configuration of a computer device 400 that achieves the devices according to the present disclosure. The computer device 400 is configured including a central processing unit (CPU) 401, a read only memory (ROM) 402, a random access memory (RAM) 403, a storage device 404, a drive device 405, a communication interface 406, and an input-output interface 407.

The CPU 401 executes a program 408, using the RAM 403. The communication interface 406 exchanges data with an external device via a network 410. The input-output interface 407 exchanges data with peripheral devices (an input device, a display device, and the like). The communication interface 406 and the input-output interface 407 can function as constituent components for acquiring or outputting data.

Note that the program 408 may be stored in the ROM 402. In addition, the program 408 may be recorded in a recording medium 409, such as a memory card, and read by the drive device 405 or may be transmitted from an external device via the network 410.

The devices according to the present disclosure can be achieved by the configuration (or a portion thereof) illustrated in FIG. 18. For example, in the case of the server device 111, the control unit 121 corresponds to the CPU 401, the ROM 402, and the RAM 403. The storage unit 122 corresponds to the storage device 404 or the drive device 405. The communication unit 123 corresponds to the communication interface 406.

Note that the constituent components of the devices according to the present disclosure may be constituted by single circuitry (a processor or the like) or a combination of a plurality of pieces of circuitry. The circuitry referred to above may be either dedicated circuitry or general-purpose circuitry. For example, a portion and the other portion of the devices according to the present disclosure may be achieved by a dedicated processor and a general-purpose processor, respectively.

The components described as single devices in the above-described example embodiments may be disposed in a distributed manner to a plurality of devices. For example, the server device 111 or the information processing device 210 may be achieved by collaboration of a plurality of computer devices using a cloud computing technology and the like.

(2) The scope of application of the present disclosure is not limited to customer service assistance in a store. For example, the present disclosure can be applied to a system for assisting guidance about exhibits by a curator or an exhibitor to visitors to a museum, an art museum, an exhibition, and the like. Such a system can also be said to assist attendance (may be rephrased as escorting) to users visiting a predetermined facility with some purpose.

Therefore, a "store clerk" in the above-described example embodiments may be rephrased as an "employee", a "guiding person", or the like. The above-described "curator" and "exhibitor" correspond to an example of the "employee" or "guiding person". In this case, the "customer" in the above-described example embodiments may be rephrased as a "visitor", a "guided person", or the like.

(3) The present invention was described above using the above-described example embodiments and variations as exemplary examples. However, the present invention is not limited to the example embodiments and variations. The present invention can include, within the scope of the present invention, example embodiments to which various modifications and applications that a so-called person skilled in the art can conceive are applied. In addition, the present invention can include an example embodiment that is constituted by appropriately combining or replacing matters described herein as needed basis. For example, matters described using a specific example embodiment can be applied to other example embodiments within an extent not causing inconsistency.

5: Supplementary Note (Supplementary Note 1)
An information processing device comprising:
identification means for identifying locations of customers in a space;
determination means for determining a deployment of store clerks, based on the number of the store clerks and the identified locations; and
output means for outputting deployment information indicating the determined deployment.

(Supplementary Note 2)
The information processing device according to supplementary note 1, wherein the identification means identifies locations of the customers, based
on tracking information indicating movement trajectories of the customers, and
the determination means determines the deployment, based on the number, the locations, and the tracking information.

(Supplementary Note 3)
The information processing device according to supplementary note 2, wherein
the determination means determines the deployment, using at least either movement speed or movement directions of the customers identified based on the tracking information.

(Supplementary Note 4)
The information processing device according to supplementary note 2 or 3, wherein
the tracking information includes information indicating the movement trajectories of the customers and movement trajectories of the store clerks, and
the determination means excludes a customer and a store clerk the locational relationship between which satisfies a predetermined condition and determines the deployment.

(Supplementary Note 5)
The information processing device according to any one of supplementary notes 2 to 4, wherein
the determination means determines the deployment, based on distances between locations of the customers and target locations of the store clerks.

(Supplementary Note 6)
The information processing device according to supplementary note 5, wherein
the determination means assigns weights to the distances according to behavior of the customers identified based on the tracking information.

(Supplementary Note 7)
The information processing device according to any one of supplementary notes 1 to 6, wherein
the determination means determines the deployment, based on layout information in the space.

(Supplementary Note 8)
The information processing device according to any one of supplementary notes 1 to 7, wherein the determination means determines the deployment, based on the number, the identified locations, and fields of vision of the store clerks.

(Supplementary Note 9)

The information processing device according to any one of supplementary notes 1 to 7, wherein the determination means allocates customers whose locations are identified by the identification means to the store clerks in accordance with a predetermined criterion.

(Supplementary Note 10)

The information processing device according to supplementary note 9, wherein the determination means varies the number of customers allocated to each of the store clerks according to an attribute of the store clerk.

(Supplementary Note 11)

The information processing device according to supplementary note 9, wherein the determination means varies the number of customers allocated to each of the store clerks according to a locational relationship between the store clerk and the customers.

(Supplementary Note 12)

The information processing device according to supplementary note 9, wherein the determination means allocates a plurality of customers satisfying a predetermined condition to the same store clerk.

(Supplementary Note 13)

A terminal device comprising:

acquisition means for acquiring information indicating a deployment of store clerks determined based on locations of customers and the number of the store clerks in a space; and output means for outputting the acquired information.

(Supplementary Note 14)

A terminal device comprising:

acquisition means for acquiring information indicating a deployment of store clerks determined based on locations of customers and the number of the store clerks in a space; and output means for outputting the acquired information.

(Supplementary Note 15)

An information processing method comprising:

identifying locations of customers in a space;

determining a deployment of store clerks, based on the number of the store clerks and the identified locations; and outputting deployment information indicating the determined deployment.

(Supplementary Note 16)

An information processing method comprising:

acquiring information indicating a deployment of store clerks determined based on locations of customers and the number of the store clerks in a space; and outputting the acquired information.

(Supplementary Note 17)

A non-transitory recording medium recording a program causing a computer to execute:

processing of identifying locations of customers in a space;

processing of determining a deployment of store clerks, based on the number of the store clerks and the identified locations; and processing of outputting deployment information indicating the determined deployment.

(Supplementary Note 18)

A non-transitory recording medium recording a program causing a computer to execute:

processing of acquiring information indicating a deployment of store clerks determined based on locations of customers and the number of the store clerks in a space; and processing of outputting the acquired information.

REFERENCE SIGNS LIST

110 Customer service assistance system
111 Server device
112 Terminal device
113 Recording device
114 Network
210 Information processing device
211 Identification unit
212 Determination unit
213 Output unit
300 Computer device

The invention claimed is:

1. An information processing device comprising:
   at least one memory configured to store instructions; and
   at least one processor configured to execute the instructions to:
   control, over a network, one or more cameras to capture one or more images of customers and transmit the one or more images over the network to the at least one processor;
   identify, from the one or more images captured by the one or more cameras, locations of the customers in a space, based on tracking information indicating movement trajectories of the customers;
   exclude a customer, of the customers, and a store clerk, of store clerks, whose locational relationship satisfies a predetermined condition, determine target locations of the store clerks, based on the identified locations and fields of vision of the store clerks, such that the customers are allocated to the store clerks falling within a predetermined angular range equivalent to a field of vision from the target locations, and determine a deployment of the store clerks, based on the number of the store clerks, the identified locations, the target locations of the store clerks, and the tracking information; and
   output, over the network and to one or more terminal devices of one or more of the store clerks, deployment information indicating the determined deployment, wherein
   the tracking information includes information indicating the movement trajectories of the customers and movement trajectories of the store clerks, and
   the predetermined condition is at least one of a condition requiring a distance between a store clerk and a customer to be equal to or less than a predetermined threshold value and a condition requiring a distance between a store clerk and a customer to have been kept at a short distance for a predetermined period.

2. The information processing device according to claim 1, wherein
   the at least one processor is configured to:
   determine the deployment, using at least either movement speed or movement directions of the customers identified based on the tracking information.

3. The information processing device according to claim 2, wherein
   the at least one processor is configured to:
   determine the deployment, based on distances between locations of the customers and target locations of the store clerks.

4. The information processing device according to claim 3, wherein
the at least one processor is configured to:
assign weights to the distances according to behavior of the customers identified based on the flow line information.

5. The information processing device according to claim 1, wherein
the at least one processor is configured to:
determine the deployment, based on distances between locations of the customers and target locations of the store clerks.

6. The information processing device according to claim 5, wherein
the at least one processor is configured to:
assign weights to the distances according to behavior of the customers identified based on the tracking information.

7. The information processing device according to claim 1, wherein
the at least one processor is configured to:
determine the target locations, based on the identified locations and layout information in the space, such that no line segment connecting a target location and the location of a customer overlaps an obstacle, and determine the deployment of the store clerks, based on the number of the store clerks, the identified locations, the target locations of the store clerks, and the tracking information.

8. The information processing device according to claim 1, wherein
the at least one processor is configured to:
allocate customers whose locations are identified to the store clerks in accordance with a predetermined criterion.

9. The information processing device according to claim 8, wherein
the at least one processor is configured to:
vary the number of customers allocated to each of the store clerks according to an attribute of the store clerk.

10. The information processing device according to claim 8, wherein
the at least one processor is configured to:
vary the number of customers allocated to each of the store clerks according to a locational relationship between the store clerk and the customers.

11. The information processing device according to claim 8, wherein
the at least one processor is configured to:
allocate a plurality of customers satisfying a predetermined condition to the same store clerk.

12. An information processing method implemented by at least one processor and comprising:
controlling, over a network, one or more cameras to capture one or more images of customers and transmit the one or more images over the network to the at least one processor;
identifying, from the one or more images captured by the one or more cameras, locations of the customers in a space, based on tracking information indicating movement trajectories of the customers;
excluding a customer, of the customers, and a store clerk, of store clerks, whose locational relationship satisfies a predetermined condition, determining target locations of the store clerks, based on the identified locations and fields of vision of the store clerks, such that the customers are allocated to the store clerks falling within a predetermined angular range equivalent to a field of vision from the target locations, and determining a deployment of store clerks, based on the number of the store clerks, the identified locations, the target locations of the store clerks, and the tracking information; and
outputting, over the network and to one or more terminal devices of one or more of the store clerks, deployment information indicating the determined deployment, wherein
the tracking information includes information indicating the movement trajectories of the customers and movement trajectories of the store clerks, and
the predetermined condition is at least one of a condition requiring a distance between a store clerk and a customer to be equal to or less than a predetermined threshold value and a condition requiring a distance between a store clerk and a customer to have been kept at a short distance for a predetermined period.

13. A non-transitory recording medium recording a program causing a computer to execute:
processing of controlling, over a network, one or more cameras to capture one or more images of customers and transmit the one or more images over the network to the at least one processor;
processing of identifying, from the one or more images captured by the one or more cameras, locations of the customers in a space, based on tracking information indicating movement trajectories of the customers;
processing of excluding a customer, of the customers, and a store clerk, of the store clerks, whose locational relationship satisfies a predetermined condition, determining target locations of the store clerks, based on the identified locations and fields of vision of the store clerks, such that the customers are allocated to the store clerks falling within a predetermined angular range equivalent to a field of vision from the target locations, and determining a deployment of store clerks, based on the number of the store clerks, the identified locations, the target locations, and the tracking information; and
processing of outputting, over the network and to one or more terminal devices of one or more of the store clerks, deployment information indicating the determined deployment, wherein
the tracking information includes information indicating the movement trajectories of the customers and movement trajectories of the store clerks, and
the predetermined condition is at least one of a condition requiring a distance between a store clerk and a customer to be equal to or less than a predetermined threshold value and a condition requiring a distance between a store clerk and a customer to have been kept at a short distance for a predetermined period.

* * * * *